United States Patent
Haseba et al.

(10) Patent No.: US 11,460,005 B2
(45) Date of Patent: Oct. 4, 2022

(54) CONDITION MONITORING SYSTEM AND WIND TURBINE GENERATION APPARATUS

(71) Applicant: NTN CORPORATION, Osaka (JP)

(72) Inventors: Takashi Haseba, Kuwana (JP); Yosuke Suzuki, Kuwana (JP); Toru Takahashi, Kuwana (JP)

(73) Assignee: NTN CORPORATION, Osaka (JP)

( * ) Notice: Subject to any disclaimer, the term of this patent is extended or adjusted under 35 U.S.C. 154(b) by 297 days.

(21) Appl. No.: 16/085,878

(22) PCT Filed: Mar. 16, 2017

(86) PCT No.: PCT/JP2017/010659
§ 371 (c)(1),
(2) Date: Sep. 17, 2018

(87) PCT Pub. No.: WO2017/159784
PCT Pub. Date: Sep. 21, 2017

(65) Prior Publication Data
US 2019/0101103 A1    Apr. 4, 2019

(30) Foreign Application Priority Data

Mar. 17, 2016 (JP) .............................. JP2016-053679
Mar. 17, 2016 (JP) .............................. JP2016-053691
(Continued)

(51) Int. Cl.
*F03D 17/00* (2016.01)
*G01M 99/00* (2011.01)
(Continued)

(52) U.S. Cl.
CPC ............. *F03D 17/00* (2016.05); *F03D 80/70* (2016.05); *G01H 1/003* (2013.01);
(Continued)

(58) Field of Classification Search
CPC combination set(s) only.
See application file for complete search history.

(56) References Cited

U.S. PATENT DOCUMENTS 6,370,957 B1    4/2002  Filippenko et al.
9,004,753 B1 *  4/2015  Maresca, Jr. ......... G01J 5/0088
                                              374/45
(Continued)

FOREIGN PATENT DOCUMENTS

CN    102713554 A    10/2012
CN    104160145 A    11/2014
(Continued)

OTHER PUBLICATIONS

JP-2008087093-A, Espacenet English Translation, downloaded from the Internet Aug. 9, 2021 (Year:2008) (Year: 2008).*
(Continued)

*Primary Examiner* — Alexander Satanovsky
*Assistant Examiner* — Lyudmila Zaykova-Feldman
(74) *Attorney, Agent, or Firm* — McDermott Will & Emery LLP

(57) ABSTRACT

A condition monitoring system includes a vibration sensor for measuring a vibration waveform of a bearing in a wind turbine generation apparatus and a data processor for diagnosing abnormality of the bearing. In the data processor, an evaluation value computing unit time-sequentially computes an evaluation value that characterizes an effective value of vibration waveform data output from the vibration sensor within a certain time. A diagnosis unit diagnoses abnormality of the bearing based on transition of temporal change of the evaluation value. The evaluation value computing unit computes the minimum value of the effective values of vibration waveform data within a certain time, as the evaluation value.

4 Claims, 25 Drawing Sheets

(30) Foreign Application Priority Data

Mar. 23, 2016 (JP) .............................. JP2016-058250
Mar. 15, 2017 (JP) .............................. JP2017-049833
Mar. 15, 2017 (JP) .............................. JP2017-049838

(51) Int. Cl.
    *G01M 13/045*      (2019.01)
    *F03D 80/70*      (2016.01)
    *G01H 1/00*      (2006.01)

(52) U.S. Cl.
    CPC .......... *G01M 13/045* (2013.01); *G01M 99/00* (2013.01); *F05B 2240/50* (2013.01); *F05B 2260/80* (2013.01); *F05B 2270/334* (2013.01)

(56) References Cited

U.S. PATENT DOCUMENTS

| | | | | |
|---|---|---|---|---|
| 2002/0013635 | A1* | 1/2002 | Gotou | G01M 13/045 700/108 |
| 2006/0224367 | A1* | 10/2006 | Fukui | A61B 5/7282 703/2 |
| 2007/0118301 | A1* | 5/2007 | Andarawis | G01M 5/00 702/33 |
| 2007/0129861 | A1* | 6/2007 | Hashiba | B60T 8/368 701/1 |
| 2008/0033695 | A1* | 2/2008 | Sahara | G01H 1/003 702/185 |
| 2009/0319205 | A1* | 12/2009 | Borger | G01H 11/08 702/56 |
| 2011/0223031 | A1* | 9/2011 | Bond | G01S 13/52 416/229 R |
| 2013/0006540 | A1 | 1/2013 | Sakaguchi et al. | |
| 2015/0116131 | A1 | 4/2015 | Ikeda et al. | |
| 2015/0247783 | A1* | 9/2015 | Kondo | G01M 7/00 702/39 |
| 2015/0369698 | A1* | 12/2015 | Sakaguchi | G01M 13/04 702/56 |
| 2016/0084234 | A1* | 3/2016 | De Bauw | F03D 7/048 702/41 |
| 2016/0215764 | A1* | 7/2016 | Sakaguchi | G01M 5/0066 |
| 2016/0377076 | A1* | 12/2016 | Mori | G01H 1/00 702/182 |

FOREIGN PATENT DOCUMENTS

| | | |
|---|---|---|
| CN | 105067262 A | 11/2015 |
| EP | 2824324 A1 | 1/2015 |
| JP | 07-159469 A | 6/1995 |
| JP | 08-110262 A | 4/1996 |
| JP | 2000-099484 A | 4/2000 |
| JP | 2002-022617 A | 1/2002 |
| JP | 2003-050157 A | 2/2003 |
| JP | 2008087093 A * | 4/2008 |
| JP | 2009-020090 A | 1/2009 |
| JP | 2010-181151 A | 8/2010 |
| JP | 2011-154020 A | 8/2011 |
| JP | 2017-026421 A | 2/2017 |
| WO | 2014/161590 A1 | 10/2014 |
| WO | WO-2014161590 A1 * | 10/2014 .......... G01M 13/045 |

OTHER PUBLICATIONS

Partial Supplementary European Search Report issued in corresponding European Application No. 17766780.5, dated Sep. 30, 2019.

Chinese Office Action issued in corresponding Chinese Patent Application No. 201780018017.1, dated Mar. 26, 2020, with English translation.

International Search Report issued in corresponding International Patent Application No. PCT/JP2017/010659, dated Jun. 20, 2017, with English Translation.

\* cited by examiner

CONDITION MONITORING SYSTEM AND WIND TURBINE GENERATION APPARATUS

CROSS REFERENCE

This application is the U.S. National Phase under 35 U.S.C. § 371 of International Application No. PCT/JP2017/010659 tiled on Mar. 16, 2017, which claims the benefit of Japanese Application No. 2016-053679, filed on Mar. 17, 2016, Japanese Application No. 2016-053691, filed on Mar. 17, 2016, Japanese Application No. 2016-058250, filed on Mar. 23, 2016, Japanese Application. No. 2017-049833, filed on Mar. 15, 2017, and Japanese Application No. 2017-049838, filed on Mar. 15, 2017, the entire contents of each are hereby incorporated by reference.

TECHNICAL FIELD

The present invention relates to a condition monitoring system that monitors a state of a mechanical component in an apparatus, and more specifically to a condition monitoring system that monitors a state of a mechanical component in a wind turbine generation apparatus.

BACKGROUND ART

In a wind turbine generation apparatus, the main shaft connected to blades receiving wind is rotated, and after the gearbox increases the speed of rotation of the main shaft, the rotor of the generator is rotated to generate electric power. Each of the main shaft and the rotation shafts of the gearbox and the generator is rotatably supported by a rolling bearing. A condition monitoring system (CMS) is known to diagnose abnormality of such a bearing. In such a condition monitoring system, whether damage occurs in the bearing is diagnosed using vibration waveform data measured by a vibration sensor fixed to the bearing.

A typical diagnostic systems is disclosed, for example, in Japanese Patent Laying-Open No. 2000-99484 (PTL 1), which provides a diagnostic system that diagnoses degradation of a calculator serving as a diagnosis target. The diagnostic system described in PTL 1 is configured to store information received from an information acquisition unit for acquiring information about the calculator into a storage circuit and read the information stored in the storage circuit to create a trend graph. In PTL 1, moving average is determined based on the created trend graph, and if the moving average value is equal to or smaller than a preset threshold, the calculator is diagnosed as being normal, whereas if the moving average value is equal to or greater than a threshold, the calculator is diagnosed as being abnormal.

A condition monitoring system that monitors a state of an internal device in a general apparatus including a computing unit is described in, for example, Japanese Patent Laying-Open No. 7-159469 (PTL 2), in which when abnormality of a target device is detected based on a signal output from a circuit measuring an internal state of the target device, a trigger to start measurement and recording is generated for a measurement element circuit and a recording unit in response to the detection signal.

Japanese Patent Laying-Open No. 2009-20090 (PTL 3) describes an abnormality diagnosing apparatus that diagnoses abnormality of a rotating part and a sliding part for use in a mechanical facility. This abnormality diagnosing device analyzes the frequency of a signal generated from the rotating part to determine a frequency component of measurement data and extracts a frequency component corresponding to an abnormal frequency of vibration resulting from the abnormality of the rotating part from the frequency component of the measurement data. The extracted frequency component is then compared with a threshold to diagnose the presence/absence of abnormality of the rotating part. In PTL 3, the threshold is set individually for each of the frequency of fundamental and the frequency of harmonic of the abnormal frequency in order to improve the accuracy of diagnosis of the presence/absence of abnormality.

CITATION LIST

Patent Literature

PTL 1: Japanese Patent Laying-Open No. 2000-99484
PTL 2: Japanese Patent Laying-Open No. H07-159469
PTL 3: Japanese Patent Laying-Open No. 2009-20090

SUMMARY OF INVENTION

Technical Problem

In the condition monitoring system applied to a wind turbine generation apparatus, when the rotational speed of the main shaft and the rotational shafts of the gearbox and the generator is low (for example, 100 rpm or lower), the magnitude of vibration of each individual bearing is smaller than when the rotational speed is high. Therefore, as the rotational speed decreases, the effect of noise superimposed on vibration waveform data output from the vibration sensor increases. As a result, the possibility that abnormality of the bearing is erroneously diagnosed increases when the rotational speed of the main shaft and the rotational shafts of the gearbox and the generator is low.

Further, when abnormality of the bearing is to be diagnosed by determining the moving average of vibration waveform data output from the vibration sensor in accordance with the technique disclosed in Patent Literature 1 above, it is necessary to increase the data count of vibration waveform data used in the moving average in order to appropriately eliminate the effect of noise, and this makes a change in magnitude of the bearing dull. As a result, it becomes difficult to capture a change in vibration of the bearing when abnormality occurs in particular with a low rotational speed at which the magnitude of vibration of the bearing is small, possibly leading to failure of accurate diagnosis of abnormality of the bearing.

In a wind turbine generation apparatus, the operating conditions vary from hour to hour depending on the environment such as a wind condition indicating how wind blows. The operating state, such as vibration, rotational speed of the main shaft, the amount of power generated, and wind speed, also varies from hour to hour according to change in operating conditions. For example, during a time when wind is strong, the load exerted on a mechanical component in the wind turbine generation apparatus is larger than a time when wind is weak, and thus the vibration is larger. The direction of wind also changes the load on the mechanical component, thereby changing the vibration.

As a result, in the condition monitoring system applied to a wind turbine generation apparatus, the vibration waveform data measured by the vibration sensor changes from hour to hour according to change in operating conditions of the wind turbine generation apparatus. In order to accurately diagnose abnormality of the mechanical component based on the vibration waveform data, it is necessary to distinguish whether the vibration change is caused by change in operating conditions or caused by damage to the mechanical component. In order to do so, how to set the threshold to be compared with vibration waveform data for diagnosis of the presence/absence of abnormality is important.

In the condition monitoring system disclosed in Patent Literature 3 above, when noise is superimposed on a signal output from the circuit measuring the internal state of a target device, the target device may be detected as being abnormal, causing a trigger. In such a case, triggers are frequently produced due to the noise, and every time a trigger is produced, measuring and recording of the internal state of the target device is started. Then, an enormous amount of data is accumulated in the recording unit such that data at the time when the target device is normal and data at the time when the target device is abnormal are mixed. This may result in failure of accurate abnormality diagnosis based on data accumulated in the recording unit.

The present invention is then made in order to solve such a problem. A first object of the present invention is to provide a condition monitoring system that provides accurate abnormality diagnosis and a wind turbine generation apparatus.

A second object of the present invention is to provide a technique for setting a threshold for diagnosing the presence/absence of abnormality of a mechanical component in the wind turbine generation apparatus, in the condition monitoring system and the wind turbine generation apparatus including the same.

Solution to Problem

A condition monitoring system according to an aspect of the present invention monitors a state of a mechanical component in an apparatus. The condition monitoring system includes a vibration sensor for measuring a vibration waveform of the mechanical component and a processor for diagnosing abnormality of the mechanical component. The processor includes an evaluation value computing unit and a diagnosis unit. The evaluation value computing unit time-sequentially computes an evaluation value that characterizes an effective value of vibration waveform data output from the vibration sensor within a certain time. The diagnosis unit diagnoses abnormality of the mechanical component based on transition of temporal change of the evaluation value. The evaluation value computing unit is configured to compute a minimum value of the effective value of vibration waveform data within the certain time, as the evaluation value.

A condition monitoring system according to an aspect of the present invention includes a vibration sensor for measuring a vibration waveform of a mechanical component and a processor for diagnosing abnormality of the mechanical component. The processor includes a diagnosis unit and a setting unit. The diagnosis unit is configured to diagnose abnormality of the mechanical component by comparing an effective value of vibration waveform data output from the vibration sensor with a threshold. The setting unit is configured to set the threshold. The setting unit includes a first computing unit configured to compute a moving average value of effective values of n pieces (where n is an integer equal to or greater than two) of vibration waveform data output from the vibration sensor, a second computing unit configured to compute a standard deviation of effective values of n pieces of vibration waveform data, and a third computing unit configured to compute the threshold based on the moving average value computed by the first computing unit and the standard deviation computed by the second computing unit.

A condition monitoring system according to an aspect of the present invention includes a vibration sensor for measuring a vibration waveform of a mechanical component and a processor for diagnosing abnormality of the mechanical component. The processor includes an evaluation value computing unit and a diagnosis unit. The evaluation value computing unit is configured to time-sequentially compute an evaluation value that characterizes vibration waveform data output from the vibration sensor within a certain time. The diagnosis unit is configured to diagnose abnormality of the mechanical component using the vibration waveform data by starting measurement of the vibration waveform data using change of tendency of temporal change of the evaluation value computed by the evaluation value computing unit, as a trigger.

Advantageous Effects of Invention

According to the present invention, even when vibration of a mechanical component is small, abnormality of the mechanical component can be diagnosed using an evaluation value from which the effect of noise is eliminated appropriately, thereby providing accurate abnormality diagnosis.

According to the present invention, a threshold for diagnosing the presence/absence of abnormality of a mechanical component in a wind turbine generation apparatus can be set properly, thereby providing accurate abnormality diagnosis.

According to the present invention, vibration waveform data at the time when abnormality occurs in a mechanical component in an apparatus can be acquired reliably and appropriately, thereby providing accurate abnormality diagnosis.

DESCRIPTION OF EMBODIMENTS

Embodiments of the present invention wilt be described in detail below with reference to the figures. The same or corresponding parts in the figures are denoted with the same reference signs and a description thereof will not be repeated.

First Embodiment

Figure 1:
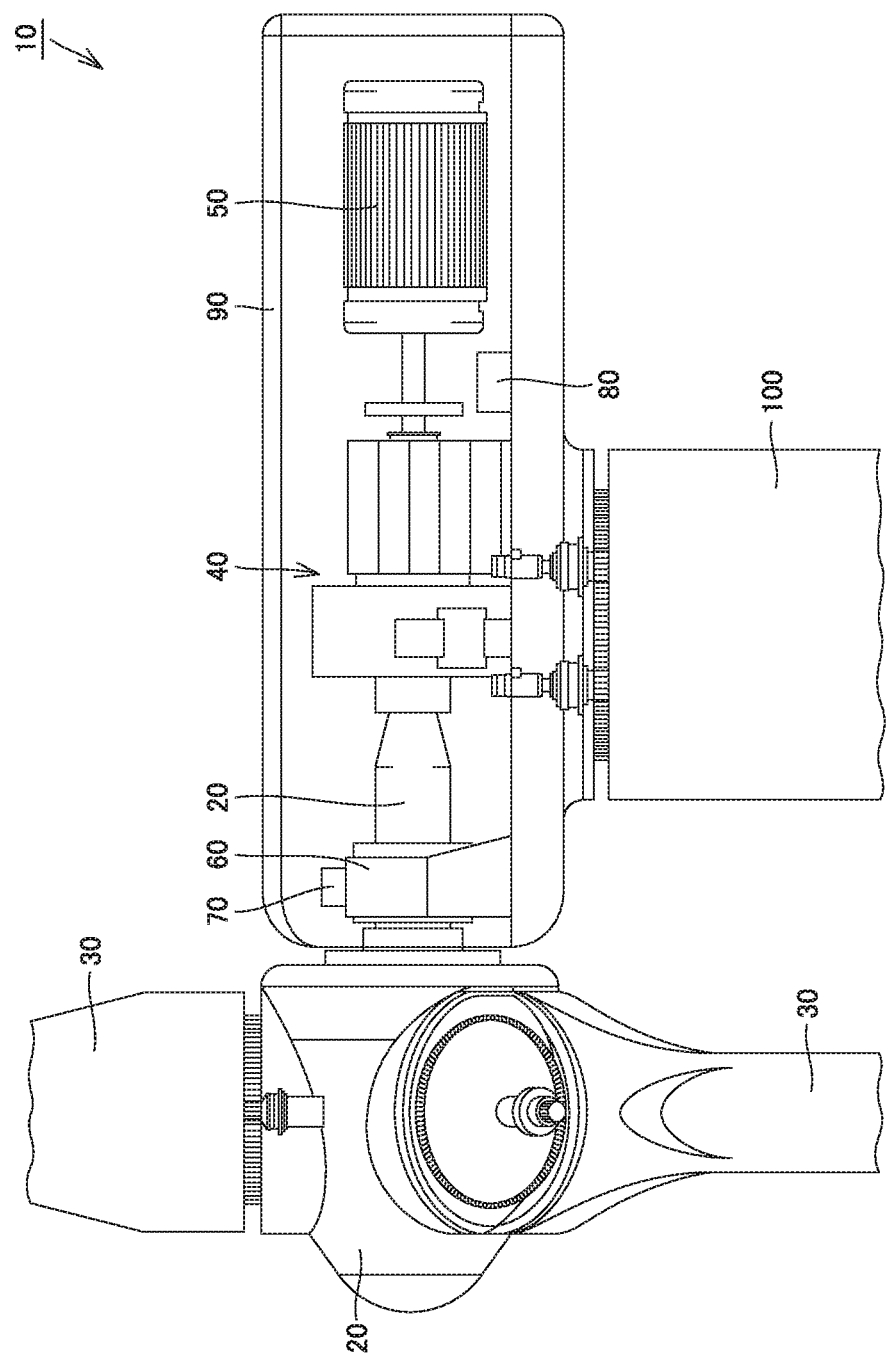
FIG. 1 is a diagram schematically showing a configuration of a wind turbine generation apparatus including a condition monitoring system according to a first embodiment.

FIG. 1 is a diagram schematically showing a configuration of a wind turbine generation apparatus including a condition monitoring system according to a first embodiment of the present invention. Referring to FIG. 1, wind turbine generation apparatus 10 includes a main shaft 20, a blade 30, a gearbox 40, a generator 50, a main shaft bearing (hereinafter simply referred to as "bearing") 60, a vibration sensor 70, and a data processor 80. Gearbox 40, generator 50, bearing 60, vibration sensor 70, and data processor 80 are installed in a nacelle 90, and nacelle 90 is supported by a tower 100.

Main shaft 20 extends into nacelle 90 to be connected to the input shaft of gearbox 40 and is rotatably supported by bearing 60. Main shaft 20 then transmits rotational torque generated by blade 30 receiving wind power to the input shaft of gearbox 40. Blade 30 is provided at the tip end of main shaft 20 and converts wind power into rotational torque to be transmitted to main shaft 20.

Bearing 60 is fixed in nacelle 90 and rotatably supports main shaft 20. Bearing 60 is configured with a rolling bearing, for example, configured with a spherical roller bearing, a tapered roller bearing, a cylindrical roller bearing, or a ball bearing. These bearings may be a single row or a double row.

Vibration sensor 70 is fixed to bearing 60. Vibration sensor 70 measures the vibration waveform of bearing 60 and outputs the measured vibration waveform data to data processor 80. Vibration sensor 70 is configured with, for example, an acceleration sensor having a piezoelectric element.

Gearbox 40 is provided between main shaft 20 and generator 50 to increase the rotational speed of main shaft 20 for output to generator 50. As an example, gearbox 40 is configured with a gear speed-increasing mechanism including a planetary gear train, an intermediate shaft, and a high speed shaft. Although not shown, a plurality of bearings rotatably supporting a plurality of shafts are also provided in gearbox 40.

Generator 50 is connected to the output shaft of gearbox 40 to generate electric power with the rotational torque received from gearbox 40. Generator 50 is configured with, for example, an induction generator. A bearing rotatably supporting the rotor is also provided in generator 50.

Data processor 80 is provided in nacelle 90 and receives vibration waveform data of bearing 60 from vibration sensor 70. Data processor 80 diagnoses abnormality of bearing 60 using the vibration waveform data of bearing 60 under instructions of a preset program.

Figure 2:
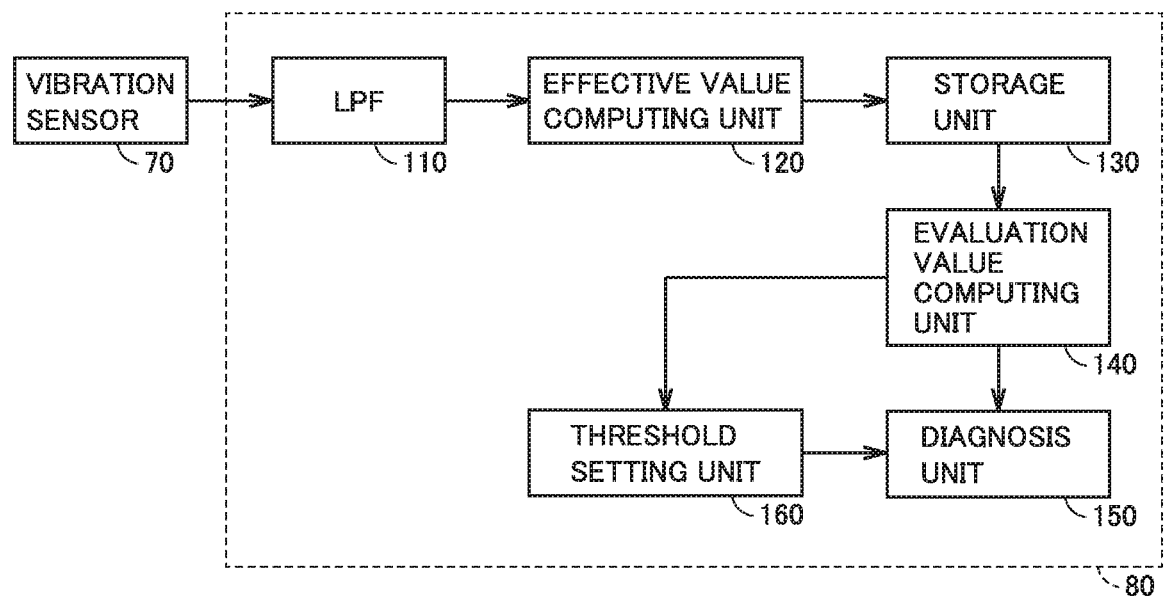
FIG. 2 is a functional block diagram showing the functional configuration of a data processor shown in FIG. 1.

FIG. 2 is a functional block diagram showing the functional configuration of data processor 80 shown in FIG. 1. Referring to FIG. 2, data processor 80 includes a low pass filter (hereinafter referred to as "LPF") 110, an effective value computing unit 120, a storage unit 130, an evaluation value computing unit 140, a diagnosis unit 150, and a threshold setting unit 160.

LPF 110 receives vibration waveform data of bearing 60 from vibration sensor 70. LPF 110 passes a signal component lower than a predetermined frequency (for example, 400 Hz) to cut off a high frequency component of the received vibration waveform data.

Effective value computing unit 120 receives vibration waveform data of bearing 60 from LPF 110. Effective value computing unit 120 computes the effective value (also referred to as "RMS (Root Mean Square) value") of vibration waveform data of bearing 60 and outputs the computed effective value of vibration waveform data to storage unit 130.

Storage unit 130 stores the effective value of vibration waveform data of bearing 60 computed by effective value computing unit 120, from hour to hour. Storage unit 130 is configured with, for example, a writable nonvolatile memory.

Storage unit 130 is configured to store the effective value of vibration waveform data of bearing 60 at least within a certain time. Storage unit 130 is configured to, for example, receive vibration waveform data of bearing 60 from effective value computing unit 120, at predetermined time intervals, to erase the effective value of the oldest vibration waveform data of the effective values of vibration waveform data within a certain time and add the effective value of the newly input vibration waveform data.

That is, storage unit 130 updates the effective value of vibration waveform data of bearing 60 within a certain time, at predetermined time intervals. As will be described later, the effective value of vibration waveform data of bearing 60 within a certain time stored in storage unit 130 is read, and abnormality of bearing 60 is diagnosed using the read effective value.

Evaluation value computing unit 140 reads effective values of vibration waveform data of bearing 60 within a certain time from storage unit 130 and then computes an evaluation value that characterizes the read effective values of vibration waveform data within a certain time. Evaluation value computing unit 140 is configured to time-sequentially compute the evaluation value. That is, evaluation value computing unit 140 updates the evaluation value at predetermined time intervals. The detail of computation of the evaluation value in evaluation value computing unit 140 will be described later.

Threshold setting unit 160 sets a threshold to be used for diagnosing the presence/absence of abnormality of bearing 60 in diagnosis unit 150. Threshold setting unit 160 outputs the set threshold to diagnosis unit 150. The detail of setting of a threshold in threshold setting unit 160 will be described later.

Diagnosis unit 150 receives an evaluation value from evaluation value computing unit 140 and receives a threshold from threshold setting unit 160. Diagnosis unit 150 compares the evaluation value with the threshold to diagnose abnormality of bearing 60. Specifically, when the evaluation value is greater than the threshold, diagnosis unit 150 diagnoses bearing 60 as being abnormal. On the other hand, when the evaluation value is equal to or smaller than the threshold, diagnosis unit 150 diagnoses bearing 60 as being normal.

Figure 3:
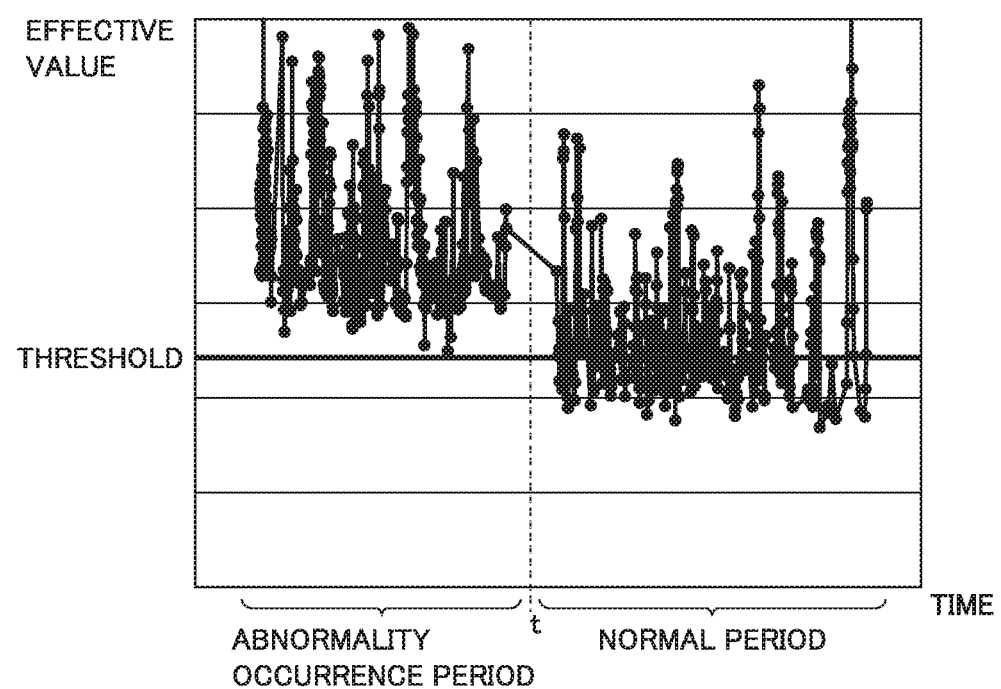
FIG. 3 is a diagram showing temporal change of effective value of vibration waveform data of a bearing stored in a storage unit.
Figure 4:
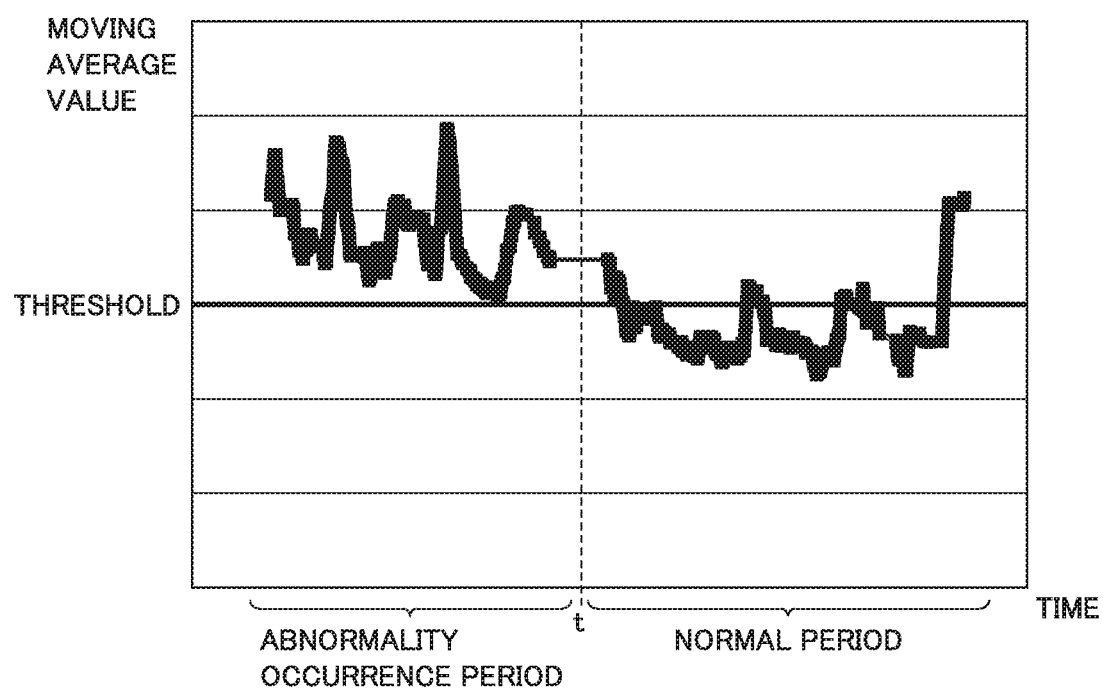
FIG. 4 is a diagram showing temporal change of moving average value of effective values of vibration waveform data within a certain period.
Figure 5:
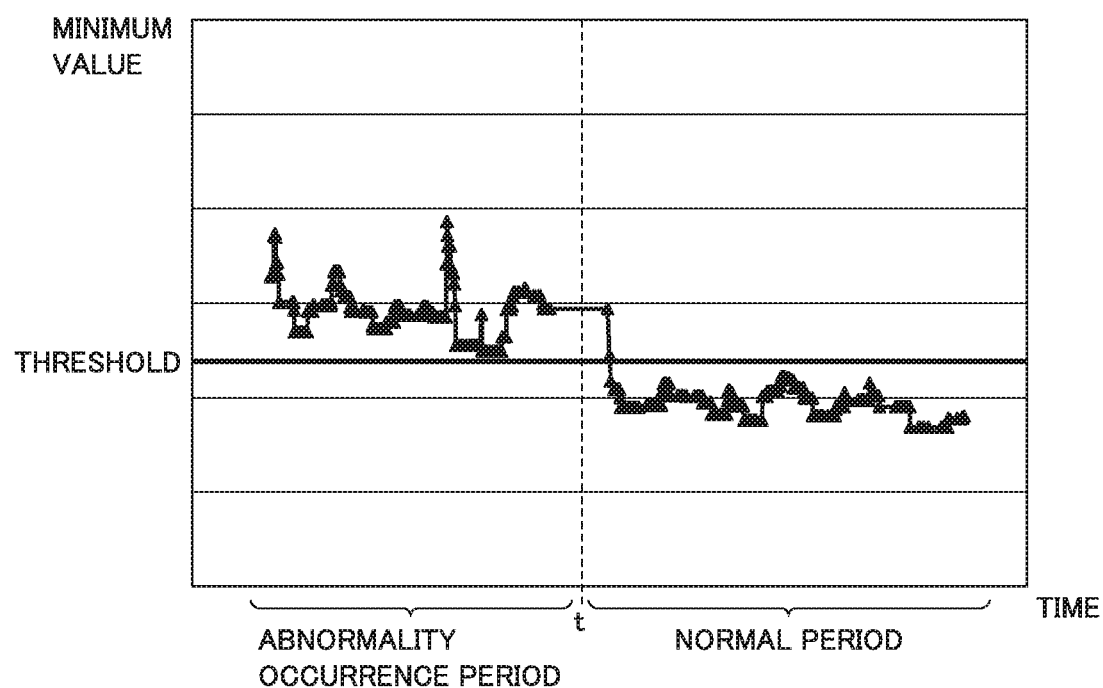
FIG. 5 is a diagram showing temporal change of minimum value of evaluation values of vibration waveform data within a certain time, computed by an evaluation value computing unit.

Referring to FIG. 3 to FIG. 5, the computation of the evaluation value in evaluation value computing unit 140 will be described below.

FIG. 3 is a diagram showing temporal change of effective value of vibration waveform data of bearing 60 stored in storage unit 130. FIG. 3 shows an example of temporal change of effective value of vibration waveform data of bearing 60 in a case where the rotational speed of main shaft 20 is low (for example, 100 rpm or lower).

In FIG. 3, it is assumed that abnormal bearing 60 is replaced by a new one at a certain time t. That is, a period before time t indicates an abnormality occurrence period in which abnormality occurs in bearing 60, and a period after time t indicates a normal period in which bearing 60 is normal.

As shown in FIG. 3, both the effective value of vibration waveform data in the abnormality occurrence period and the effective value of vibration waveform data in the normal period vary widely. When the rotational speed of main shaft 20 is low, vibration of bearing 60 is small. Therefore, the vibration waveform data output from vibration sensor 70 is significantly affected by noise and varies widely.

Here, a threshold for diagnosing the presence/absence of abnormality of bearing 60 is attempted to be set based on the temporal change of effective value of vibration waveform data shown in FIG. 3.

As shown in FIG. 3, if the threshold is set below all of the effective values of vibration waveform data in the abnormality occurrence period, most of the effective values of vibration waveform data in the normal period exceeds the threshold. As a result, although the bearing 60 is in a normal state, bearing 60 is erroneously diagnosed as being abnormal.

Then, in the present embodiment, an evaluation value that characterizes the effective values of vibration waveform data within a certain time is computed, and abnormality of bearing 60 is diagnosed using the computed evaluation value. The evaluation value can be computed by statistically processing the effective values of vibration waveform data within a certain time. For example, a moving average process can be used as the statistical processing.

FIG. 4 is a diagram showing temporal change of moving average value of effective values of vibration waveform data within a certain period. FIG. 4 shows the temporal change of effective values of vibration waveform data in FIG. 3 subjected to a moving average process. In the moving average process, assuming that a certain time is a time corresponding to 24 effective values, a simple moving average value of 24 effective values is computed.

When the temporal change of moving average value shown in FIG. 4 is compared with the temporal change of effective value of vibration waveform data shown in FIG. 3, the moving average value has a magnitude of change smaller than the effective value, which indicates that the effect of noise is reduced.

Here, a threshold for diagnosing the presence/absence of abnormality of bearing 60 is attempted to be set based on the temporal change of moving average value shown in FIG. 4, in the same manner as in FIG. 3.

As shown in FIG. 4, if a threshold is set below all of the moving average values in the abnormality occurrence period, some of the moving average values in the normal period exceed the threshold. As a result, although bearing 60 is in a normal state, bearing 60 is erroneously diagnosed as being abnormal, in the same mariner as in FIG. 3.

Here, in order to further reduce the magnitude of change of moving average value, the length of a certain period may be set to be longer than the length corresponding to 24 effective values in the moving average process. However, although increasing the length of a certain time can reduce the effect of noise, the change in magnitude of vibration of bearing 60 becomes dull. As a result, it is difficult to grasp the change of vibration of bearing 60 when abnormality occurs, possibly leading to failure of accurate abnormality diagnosis of bearing 60.

Then, evaluation value computing unit 140 computes the minimum value of vibration waveform data within a certain time as an evaluation value that characterizes the effective values of vibration waveform data within the certain time.

FIG. 5 is a diagram showing temporal change of minimum value of effective values of vibration waveform data within a certain time, computed by evaluation value computing unit 140. In FIG. 5, for the temporal change of effective value of vibration waveform data shown in FIG. 3, the minimum value of effective values within a certain period is computed time-sequentially. In FIG. 5, the certain time is set to a length equal to the certain time when the moving average value in FIG. 4 is calculated (that is, the length corresponding to 24 effective values).

When the temporal change of minimum value shown in FIG. 5 is compared with the temporal change of moving average value shown in FIG. 4, the minimum value has a magnitude of change smaller than the moving average value. This tendency is significant in particular in the normal period, which indicates that the effect of noise is further reduced.

In the effective value of vibration waveform data of bearing 60, the magnitude of noise is superimposed on the original magnitude of vibration of bearing 60. This suggests that the effect of noise is smallest in the minimum value of effective values of vibration waveform data within a certain time, among the effective values of vibration waveform data within a certain time. Therefore, setting this minimum value as an evaluation value can effectively reduce the effect of noise on the effective value of vibration waveform data of bearing 60 even when the vibration of bearing 60 is small. As a result, abnormality can be diagnosed more accurately.

Returning to FIG. 2, threshold setting unit 160 sets a threshold, based on the temporal change of minimum value of effective values of vibration waveform data within a certain time computed by evaluation value computing unit 140. In the example in FIG. 5, the threshold can be set to a value smaller than the transition of temporal change of minimum value in the abnormality occurrence period and larger than the transition of temporal change of minimum value in the normal period. This indicates that the presence/absence of abnormality of bearing 60 can be diagnosed by comparing the minimum value of effective values of vibration waveform data within a certain time with a threshold.

Specifically, when the temporal change of minimum value in each of the abnormality occurrence period and the normal period as shown in FIG. 5 is acquired, threshold setting unit 160 extracts a predetermined number of minimum values from the temporal change of minimum value in the abnormality occurrence period and computes the average value of the predetermined number of minimum values extracted. Threshold setting unit 160 also extracts a predetermined number of minimum values from the temporal change of minimum value in the normal period and then computes the average value of a predetermined number of minimum values extracted. Threshold setting unit 160 calculates the ratio between the average value in the normal period and the average value in the abnormality occurrence period and sets a coefficient to a value smaller than the calculated ratio. Then, a threshold is computed by multiplying the set coefficient by the average value in the normal period.

Figure 6:
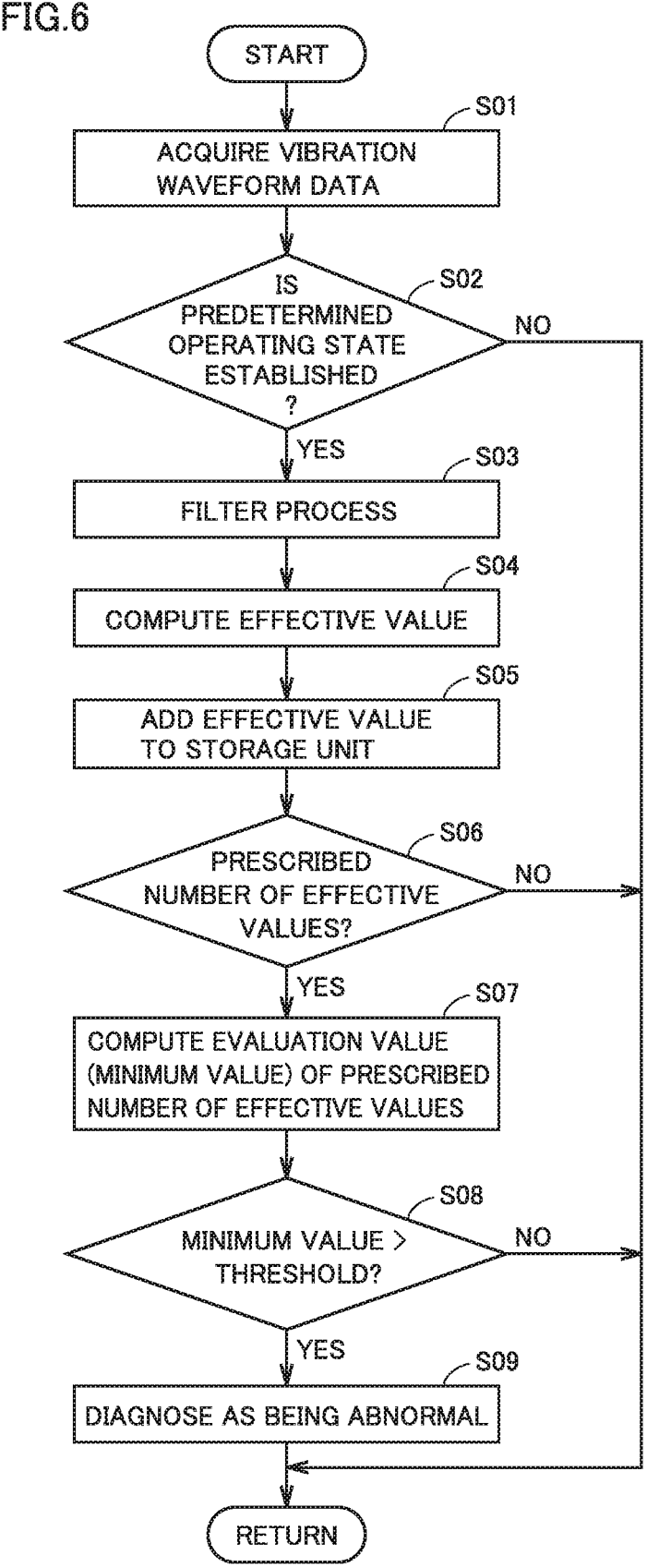
FIG. 6 is a flowchart illustrating a control process for diagnosing abnormality of the bearing in the condition monitoring system according to the first embodiment.

FIG. 6 is a flowchart illustrating a control process for diagnosing abnormality of bearing 60 in the condition monitoring system according to the first embodiment. The control process shown in FIG. 6 is repeatedly performed by data processor 80 at predetermined time intervals.

Referring to FIG. 6, at step S01, data processor 80 receives vibration waveform data of bearing 60 from vibration sensor 70. At step S02, data processor 80 determines whether a predetermined operating state is established in wind turbine generation apparatus 10. The predetermined operating state is the operating state when wind turbine generation apparatus 10 is performing rated operation, and includes the rotational speed of main shaft 20 and the rotational shafts of gearbox 40 and generator 50, the amount of generated power, torque of the rotational shaft of generator 50, wind direction, and wind speed during rated operation.

If a predetermined operating state is not established in wind turbine generation apparatus 10 (NO in the determination at S02), the subsequent processing S03 to S09 is skipped. On the other hand, if a predetermined operating state is established in wind turbine generation apparatus 10 (YES in the determination at S02), LPF 110 executes a filter process on the vibration waveform data of bearing 60.

Then, at step S04, when receiving the vibration waveform data of bearing 60 subjected to a filter process from LPF 110, effective value computing unit 120 calculates the effective value of vibration waveform data of bearing 60. At step S05, storage unit 130 stores the effective value of vibration waveform data calculated by-effective value computing unit 120.

At step S06, evaluation value computing unit 140 determines whether the data count of effective values of vibration waveform data stored in storage unit 130 satisfies a prescribed number. At step S06, the prescribed number is equivalent to the number of effective values of vibration waveform data in time sequence within a certain time. If the data count of the effective value of vibration waveform data stored in storage unit 130 does not satisfy a prescribed number (NO in the determination at S06), the subsequent processing S06 to S09 is skipped.

On the other hand, if the data count of effective values of vibration waveform data stored satisfies a prescribed number (YES in the determination at S06), evaluation value computing unit 140 proceeds to step S07, reads a prescribed number of effective values of vibration waveform data stored in storage unit 130, and computes the minimum value of a prescribed number of effective values of vibration waveform data read. Evaluation value computing unit 140 outputs the computed minimum value to diagnosis unit 150.

At step S08, diagnosis unit 150 compares the minimum value computed at step S07 with the threshold. If the minimum value is equal to or smaller than the threshold (NO in the determination at S08), diagnosis unit 150 diagnoses bearing 60 as being normal and skips the subsequent processing S09. On the other hand, if the minimum value computed at step S07 is greater than the threshold (YES in the determination at S08), at step S09, diagnosis unit 150 diagnoses bearing 60 as being abnormal.

As described above, according to the first embodiment, the minimum value of effective values of vibration waveform data within a certain time is used as an evaluation value that characterizes the effective values of vibration waveform data of bearing 60 within the certain time. Thus, the evaluation value with the reduced effect of noise can be obtained even when the rotational speed of main shaft 20 is low and the effective value of vibration waveform data is small. Accordingly, abnormality of bearing 60 can be diagnosed accurately using the evaluation value.

Although abnormality of bearing 60 is diagnosed by comparing the evaluation value with the threshold in the foregoing first embodiment, the diagnosis of abnormality of bearing 60 using an evaluation value is not limited to the foregoing configuration. In second and third embodiments, other configurations of abnormality diagnosis using an evaluation value will be described.

Second Embodiment

Figure 7:
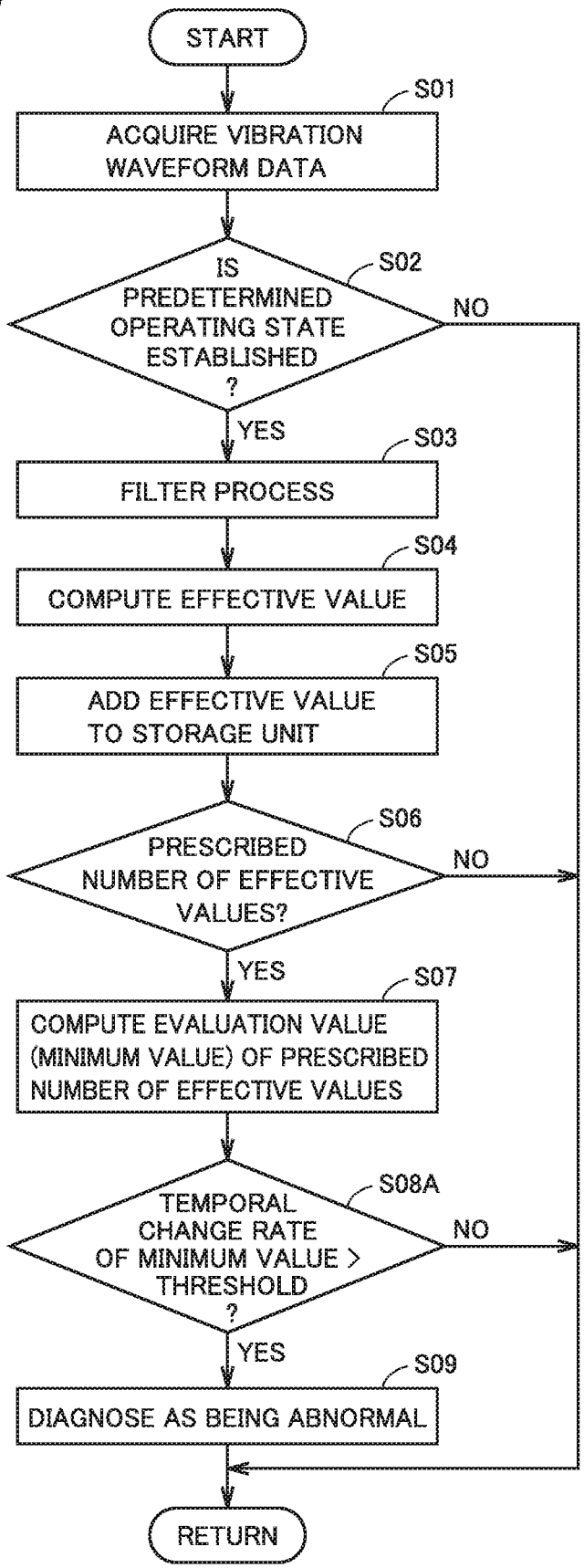
FIG. 7 is a flowchart illustrating a control process for diagnosing abnormality of the bearing in the condition monitoring system according to a second embodiment.

FIG. 7 is a flowchart illustrating a control process for diagnosing abnormality of bearing 60 in the condition monitoring system according to a second embodiment. The control process shown in FIG. 7 is repeatedly performed by data processor 80 at predetermined time intervals.

FIG. 7 differs from FIG. 6 in that in the condition monitoring system according to the second embodiment, step S08A is performed in place of step S08 after the processing at step S01 to S07 similar to those in FIG. 6.

That is, at step S07, evaluation value computing unit 140 computes the minimum value of a prescribed number of effective values of vibration waveform data read from storage unit 130, and then at step S08A, diagnosis unit 150 diagnoses the presence/absence of abnormality of bearing 60 based on the temporal change rate of minimum value, that is, the amount of change in unit time.

Specifically, evaluation value computing unit 140 computes the temporal change rate of minimum value, based on the difference between the minimum value calculated at step S07 and the minimum value calculated immediately before this minimum value. Evaluation value computing unit 140 then compares the computed temporal change rate of minimum value with a threshold. If the temporal change rate of minimum value is equal to or smaller than the threshold (NO in the determination at S08A), diagnosis unit 150 diagnoses bearing 60 as being normal and skips the subsequent processing S09. On the other hand, if the temporal change rate of minimum value is larger than the threshold (YES in the determination at S08A), at step S09, diagnosis unit 150 diagnoses bearing 60 as being abnormal.

As described above, according to the second embodiment, abnormality of bearing 60 is diagnosed using the minimum value of effective values of vibration waveform data within a certain time as an evaluation value that characterizes the effective values of vibration waveform data of bearing 60 within the certain time. The second embodiment therefore can also achieve the similar effects as in the first embodiment.

The threshold used at step S08A in FIG. 7 can be set in threshold setting unit 160 to a value greater than the temporal change rate of minimum value in the normal period and smaller than the temporal change rate of minimum value in the abnormality occurrence period.

Specifically, threshold setting unit 160 computes the average value of magnitude of the temporal change rate of minimum value in the abnormality occurrence period and computes the average value of magnitude of the temporal change rate of minimum value in the normal period. Threshold setting unit 160 then calculates the ratio between the average value of magnitude of the temporal change rate of minimum value in the normal period and the average value of magnitude of the temporal change rate of minimum value in the abnormality occurrence period and sets a coefficient to a value smaller than the calculated ratio. Threshold setting unit 160 computes a threshold by multiplying the set coefficient by the average value of magnitude of the temporal change rate of minimum value in the normal period.

Third Embodiment

Figure 8:
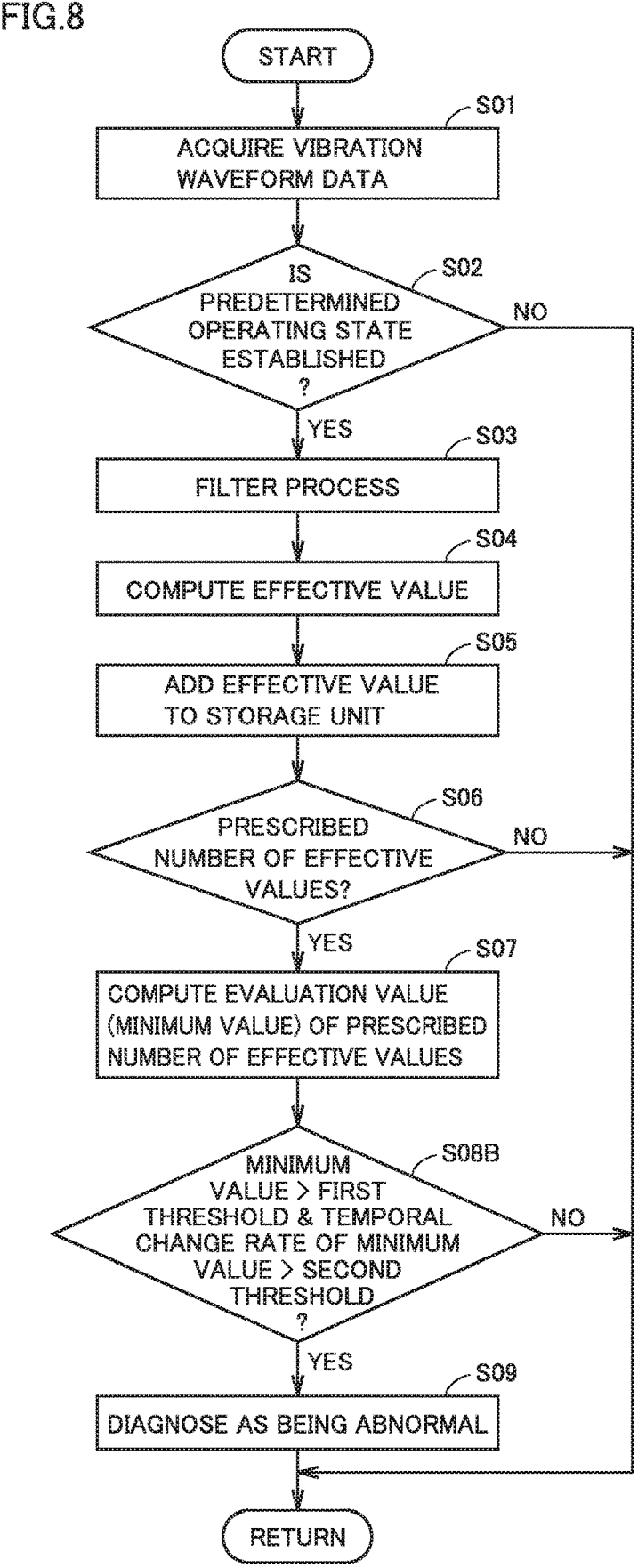
FIG. 8 is a flowchart illustrating a control process for diagnosing abnormality of the bearing in the condition monitoring system according to a third embodiment.

FIG. 8 is a flowchart illustrating a control process for diagnosing abnormality of bearing 60 in the condition monitoring system according to a third embodiment. The control process shown in FIG. 8 is repeatedly performed by data processor 80 at predetermined time intervals.

FIG. 8 differs from FIG. 6 in that in the condition monitoring system according to the third embodiment, step S08B is performed in place of step S08 after the processing at steps S01 to S07 similar to those in FIG. 6.

That is, at step S07, evaluation value computing unit 140 computes the minimum value of a prescribed number of effective values of vibration waveform data read from storage unit 130, and then at step S08B, diagnosis unit 150 diagnoses the presence/absence of abnormality of bearing 60 based on the magnitude and the temporal change rate of minimum value.

Specifically, diagnosis unit 150 compares the minimum value computed at step S07 with a first threshold. If the minimum value is equal to or smaller than the first threshold (NO in the determination at S08B), diagnosis unit 150 diagnoses bearing 60 as being normal and skips the subsequent processing S09. On the other hand, if the minimum value computed at step S07 is greater than the first threshold, diagnosis unit 150 further compares the temporal change rate of minimum value with a second threshold. If the temporal change rate of minimum value is equal to or smaller than the second threshold (NO in the determination at S08B), diagnosis unit 150 diagnoses bearing 60 as being normal and skips the subsequent processing S09. On the other hand, if the temporal change rate of minimum value is greater than the second threshold (YES in the determination at S08B), at step S09, diagnosis unit 150 diagnoses bearing 60 as being abnormal.

That is, in the abnormality diagnosis according to the third embodiment, if the minimum value of effective values of vibration waveform data within a certain time is greater than the first threshold and the temporal change rate of minimum value is greater than the second threshold, bearing 60 is diagnosed as being abnormal. By doing so, even in the case where the temporal change rate of minimum value is greater than the second threshold, when the magnitude of minimum value is equal to or smaller than the first threshold, it can be determined that the degree of effect of noise is large because the magnitude of vibration of bearing 60 is small. In such a case, bearing 60 is diagnosed as being normal. Thus, abnormality of bearing 60 can be diagnosed based on the evaluation value from which the effect of noise superimposed on the vibration waveform data is eliminated appropriately. The third embodiment therefore can also achieve the similar effects as in the first embodiment.

As explained in the first embodiment, the first threshold used at step S08B in FIG. 8 can be set to a value smaller than the transition of temporal change of minimum value in the abnormality occurrence period and greater than the transition of temporal change of minimum value in the normal period. As explained in the second embodiment, the second threshold can be set to a value greater than the temporal change rate of minimum value in the normal period and smaller than the temporal change rate of minimum value in the abnormality occurrence period.

In the foregoing first to third embodiments, vibration sensor 70 is installed at bearing 60, which is one of mechanical components in wind turbine generation apparatus 10, to diagnose abnormality of bearing 60. However, the mechanical component serving as a diagnosis target is not limited to bearing 60. This point is described for clarification. For example, a vibration sensor may be installed at a bearing provided in gearbox 40 or in generator 50 in addition to bearing 60 or in place of bearing 60, and abnormality of the bearing provided in gearbox 40 or in generator 50 may be diagnosed by a similar method as in the foregoing embodiments.

In the foregoing first to third embodiments, data processor 80 corresponds to an embodiment of "processor" in the present invention, and storage unit 130, evaluation value computing unit 140, diagnosis unit 150, and threshold setting unit 160 correspond to an embodiment of "storage unit", "evaluation value computing unit", "diagnosis unit", and "setting unit" in the present invention.

Fourth Embodiment

Figure 9:
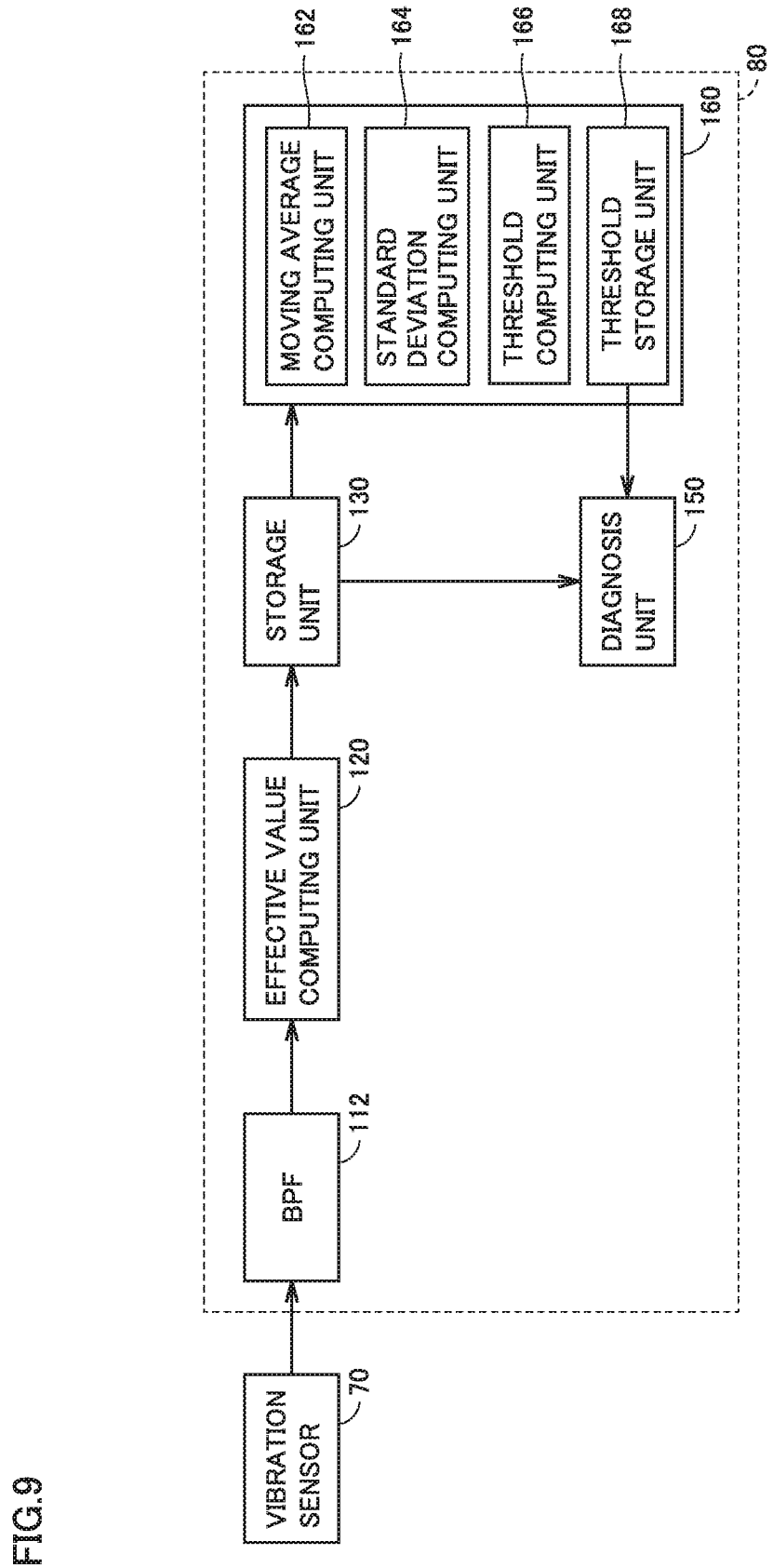
FIG. 9 is a functional block diagram showing the functional configuration of the data processor in the condition monitoring system according to a fourth embodiment.

FIG. 9 is a functional block diagram showing the functional configuration of data processor 80 in the condition monitoring system according to a fourth embodiment of the present invention. Referring to FIG. 9, data processor 80 includes a band pass filter (hereinafter referred to as "BPF")

112, an effective value computing unit 120, a storage unit 130, a threshold setting unit 160, and a diagnosis unit 150.

BPF 112 receives vibration waveform data of bearing 60 from vibration sensor 70. BPF 112 performs a filter process on the vibration waveform data of bearing 60. BPF 112 is, for example, a high pass filter (HPF). The HPF passes a signal component higher than a predetermined frequency to cut off a low frequency component of the received vibration waveform data. The HPF is provided for removing a direct-current component included in the vibration waveform data of bearing 60. The HPF may be omitted if the output of vibration sensor 70 does not include a direct-current component.

BPF 112 may further include an envelope process unit between vibration sensor 70 and the HPF. The envelope process unit receives vibration waveform data of bearing 60 from vibration sensor 70 and performs an envelope process on the received vibration waveform data to generate an envelope waveform of the vibration waveform data of bearing 60. A variety of known techniques can be applied to the envelope process computed in the envelope process unit. As an example, the vibration waveform data of bearing 60 received from vibration sensor 70 is rectified to an absolute value and passed through a low pass filter (LPF) to generate an envelope waveform of the vibration waveform data of bearing 60. In this case, the HPF receives the envelope waveform of the vibration waveform data of bearing 60 from the envelope process unit and passes a signal component higher than a predetermined frequency to cut off a low frequency component of the received envelope waveform. That is, the HPF is configured to remove a direct-current component included in the envelope waveform and extract an alternating-current component of the envelope waveform.

BPF 112 may further include an LPF. The LPF passes a signal component lower than a predetermined frequency to cut off a high frequency component of the received vibration waveform data.

Effective value computing unit 120 receives the vibration waveform data of bearing 60 subjected to a filter process from BPF 112. Effective value computing unit 120 calculates the effective value (RMS value) of vibration waveform data of bearing 60 and outputs the calculated effective value of vibration waveform data to storage unit 130.

Since the effective value of vibration waveform of bearing 60 computed by effective value computing unit 120 is an effective value of a raw vibration waveform that does not undergo an envelope process, for example, an increase of the value is small for impulse-like vibration which increases only when the rolling element passes through a place where flaking occurs in part of the raceway of bearing 60, whereas an increase of the value is large for continuous vibration occurring in the case of smearing of the contact surface between the raceway and the rolling element or poor lubrication.

On the other hand, as described above, when the envelope process unit is provided, the effective value of alternating-current component of the envelope waveform computed by effective value computing unit 120 shows a small increase for continuous vibration occurring in the case of smearing of the raceway or poor lubrication and shows a large increase for impulse-like vibration.

Storage unit 130 stores the effective value of vibration waveform data of bearing 60 computed by effective value computing unit 120, from hour to hour. Storage unit 130 is configured, for example, with a writable nonvolatile memory. Storage unit 130 is configured to store at least latest n (n is an integer equal to or greater than two) effective values of vibration waveform data of bearing 60. In the following description, the effective value of vibration waveform data is simply referred to as "vibration waveform data".

Threshold setting unit 160 sets a threshold to be used for diagnosing the presence/absence of abnormality of bearing 60. Threshold setting unit 160 outputs the set threshold to diagnosis unit 150. The detail of the setting of a threshold in threshold setting unit 160 will be described later.

Diagnosis unit 150 diagnoses abnormality of bearing 60, based on the threshold set in threshold setting unit 160. Specifically, diagnosis unit 150 compares the read vibration waveform data with the threshold set by threshold setting unit 160. If it is determined that the vibration waveform data exceeds the threshold, diagnosis unit 150 issues an alarm for giving a notice of abnormality of bearing 60. Diagnosis unit 150 also diagnoses abnormality of bearing 60, based on the transition of temporal change of vibration waveform data measured.

Figure 10:
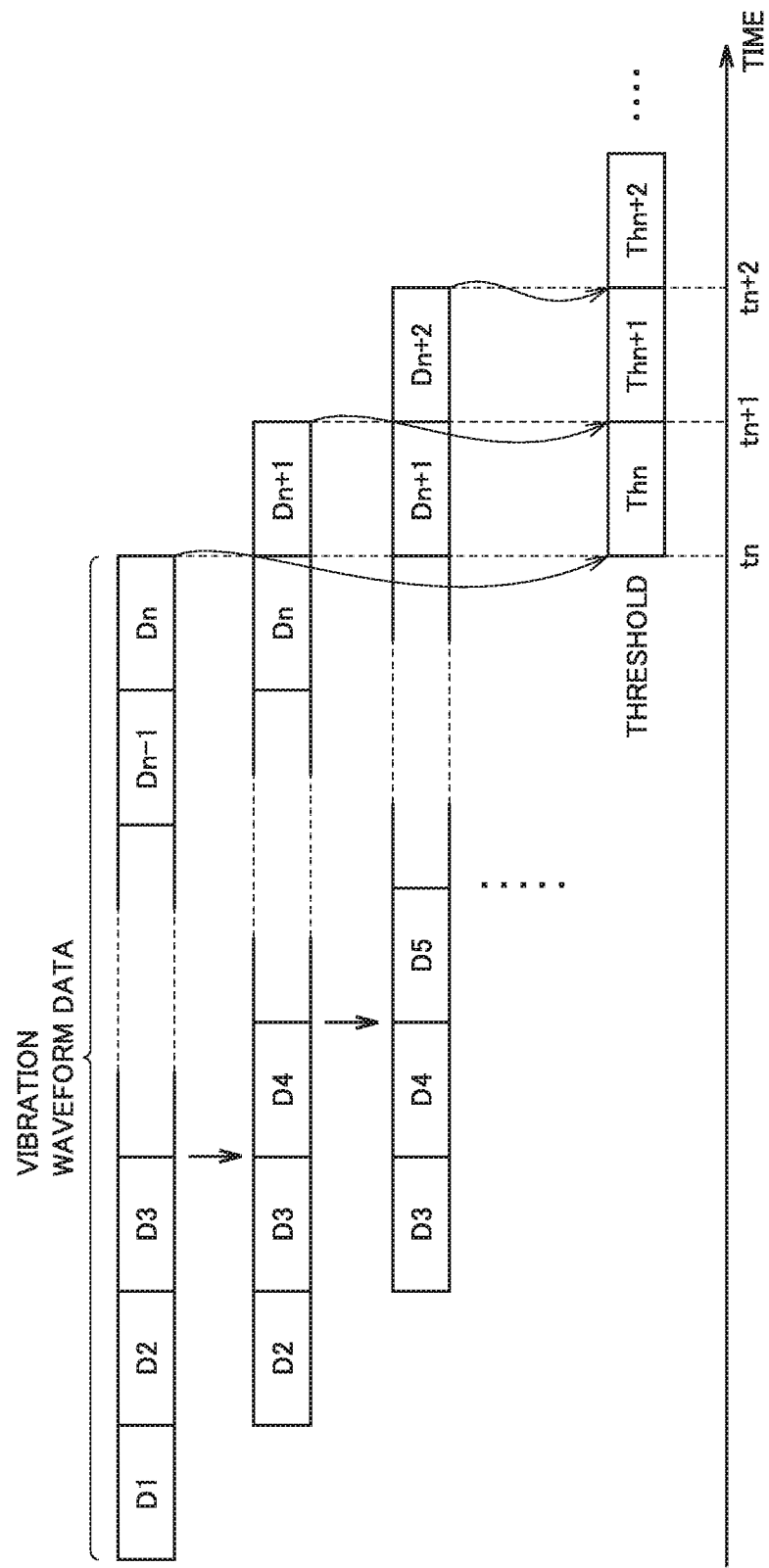
FIG. 10 is a diagram illustrating the operation of a threshold setting unit shown in FIG. 9.
Figure 11:
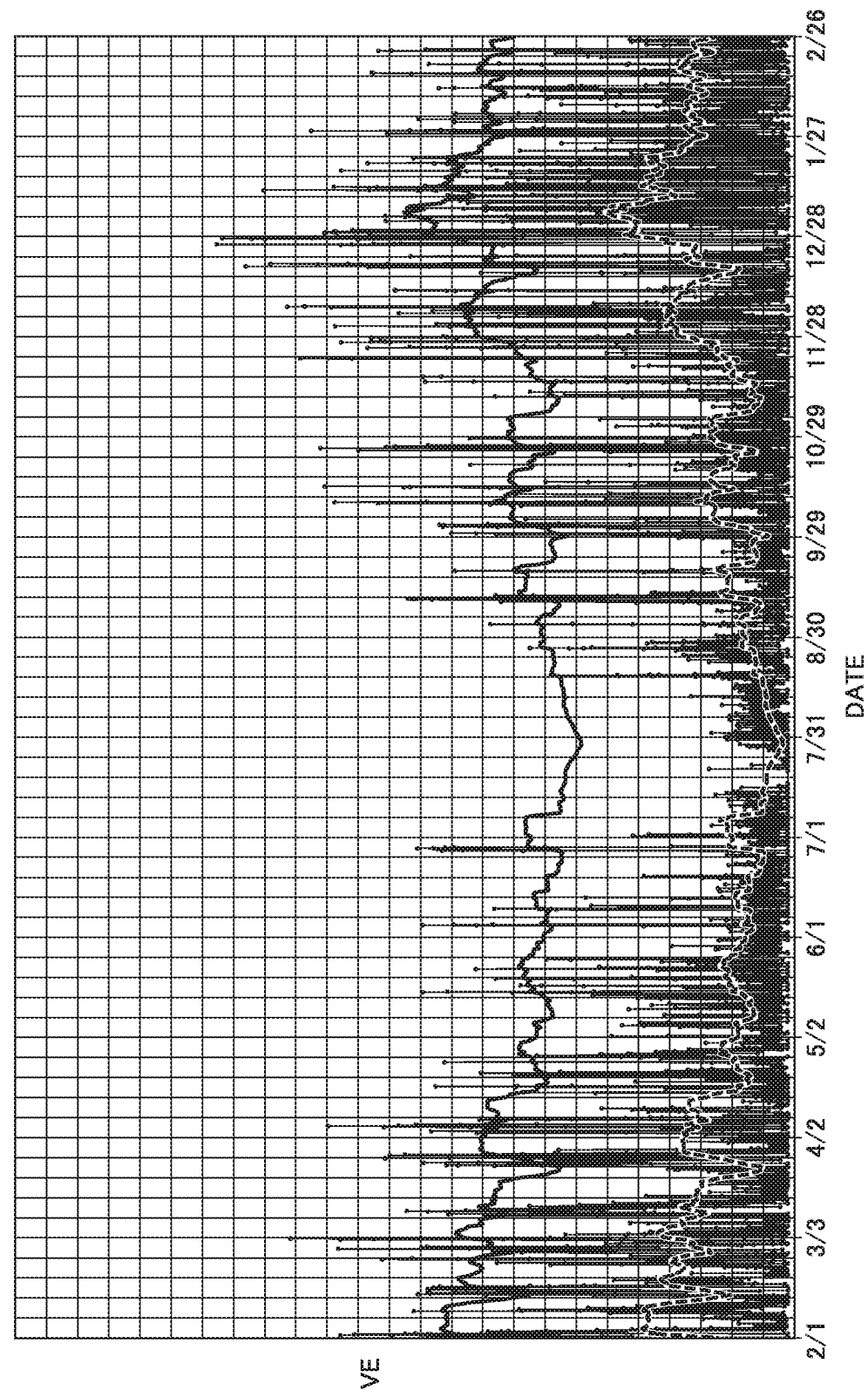
FIG. 11 is a graph showing an example of the threshold set by the threshold setting unit.

Referring now to FIG. 10 and FIG. 11, the threshold setting process performed in threshold setting unit 160 will be described.

As shown in FIG. 9, threshold setting unit 160 includes a moving average computing unit 162 (first computing unit), a standard deviation computing unit 164 (second computing unit), a threshold computing unit 166 (third computing unit), and a threshold storage unit 168.

FIG. 10 is a diagram illustrating the operation of threshold setting unit 160. Referring to FIG. 10, storage unit 130 receives vibration waveform data of bearing 60 from effective value computing unit 120 at predetermined time intervals. In FIG. 10, D1 to Dn+2 represent vibration waveform data applied to storage unit 130 at predetermined time intervals.

Threshold setting unit 160 successively reads the vibration waveform data in the specified period from the vibration waveform data stored in storage unit 130 and performs a moving average computing process, a standard deviation computing process, and a threshold computing process to calculate a threshold. This process of calculating a threshold is performed preferably when vibration waveform data is sufficiently accumulated in storage unit 130.

Specifically, moving average computing unit 162 computes the moving average value of the read latest n pieces of vibration waveform data of bearing 60. In the example in FIG. 10, latest n pieces of vibration waveform data D1 to Dn of bearing 60 up to time to are read from storage unit 130, and then an average value MAn of n pieces of vibration waveform data D1 to Dn is calculated. Subsequently, latest n pieces of vibration waveform data D2 to Dn+2 of bearing 60 up to time tn+1 are read from storage unit 130, and then an average value MAn+1 of n pieces of vibration waveform data D2 to Dn+1 is calculated. Further, latest n pieces of vibration waveform data D3 to Dn+2 of bearing 60 up to time tn+2 are read from storage unit 130, and then an average value MAn+2 of n pieces of vibration waveform data D3 to Dn+2 is calculated. The moving average value may be a simple moving average value or may be a weighted moving average value. In this way, moving average computing unit 162 calculates moving average value MA using latest n pieces of vibration waveform data of bearing 60.

Standard deviation computing unit 164 computes a standard deviation $\sigma$ of n pieces of vibration waveform data of bearing 60.

Threshold computing unit 166 computes a threshold using moving average value MA calculated by moving average computing unit 162 and standard deviation $\sigma$ calculated by standard deviation computing unit 164. Letting the threshold be Th, threshold Th is written as Equation (1) below.

$$Th = MA + k \cdot \sigma \quad (1)$$

Coefficient k in Equation (1) above is a positive value (k>0), for example, set as k=2. That is, threshold Th is set to, for example, "MA+2σ".

In the example in FIG. 10, threshold $Th_n$ is calculated using moving average value $MA_n$ at time $t_n$ and standard deviation σ, threshold $Th_{n+1}$ is calculated using moving average value $MA_{n+1}$ at time $t_{n+1}$ and standard deviation σ, and threshold $Th_{n+2}$ is calculated using moving average value $MA_{n+2}$ at time $t_{n+2}$ and standard deviation σ. In this way, threshold computing unit 166 calculates threshold Th and stores the calculated threshold Th in threshold storage unit 168.

Threshold Th includes a seasonal variation component. Diagnosis unit 150 is therefore configured to use threshold Th during the same time as the present season in the past, of thresholds Th stored in threshold storage unit 168. That is, diagnosis unit 150 is configured to use threshold Th set based on the vibration waveform data in the past under the same operating condition as for the vibration waveform data.

The operating condition of the wind turbine generation apparatus usually depends on the environment, such as wind condition, and changes mainly with seasons. With the configuration as described above, diagnosis unit 150 performs diagnosis of abnormality of bearing 60 using threshold Th adapted to change in operating condition, such as seasonal factors. As shown in FIG. 3, threshold Th is set through a statistical process for n pieces of vibration waveform data and therefore changes according to change in operating condition of wind turbine generation apparatus 10. That is, threshold Th can reflect change in operating condition of wind turbine generation apparatus 10.

Then, the vibration waveform data of bearing 60 changing with the operating condition of wind turbine generation apparatus 10 is compared with threshold Th reflecting the operating condition and, thus, the effect of change in operating condition of wind turbine generation apparatus 10 is reduced in the comparison result. As a result, change of vibration resulting from damage to bearing 60 can be grasped, thereby providing accurate abnormality diagnosis.

FIG. 11 is a graph showing an example of the threshold set by threshold setting unit 160. FIG. 11 shows temporal change of the effective value of vibration waveform data measured by vibration sensor 70 for about one year from February 1 in a certain year to February 26 in the next year and the moving average value and the threshold of the vibration waveform data.

The black circles in FIG. 11 show the effective values of vibration waveform data of bearing 60. The dashed line in FIG. 11 shows temporal change of moving average value MA of effective values of n pieces of vibration waveform data. In the example in FIG. 11, n=120. The solid line in FIG. 11 shows the temporal change of the threshold using moving average value MA of effective values of n pieces of vibration waveform data and standard deviation σ. The threshold is calculated using the equation Th=MA+2σ.

As shown in FIG. 11, in the measurement period, the effective value of vibration waveform data changes significantly. In the example in FIG. 11, the effective value is relatively large from December to January whereas the effective value is relatively small from July to August In this manner, the effective value changes significantly because of the operating condition changing from season to season.

In order to make accurate diagnosis even in a period in which the effective value is relatively small, the threshold may be set to a certain value based on the effective value in this period. However, doing so causes the effective value to exceed the threshold frequently in a period in which the effective value is relatively large, making accurate diagnosis difficult.

In the present embodiment, the threshold is set based on the moving average value calculated from the effective values of vibration waveform data of bearing 60 recorded in a certain period in the past. In particular, the threshold is set using the effective values of vibration waveform data during the time in which it is determined that bearing 60 is normal in the past. Therefore, abnormality is diagnosed with reference to the threshold set in the same operating condition in the past (for example, during the same time in the past), and with this configuration, the threshold is relatively small in a period in which the effective value is relatively small while the threshold is relatively large in a period in which the effective value is relatively large. In this manner, since the threshold reflects change in operating condition of wind turbine generation apparatus 10, accurate abnormality diagnosis can be provided.

Figure 12:
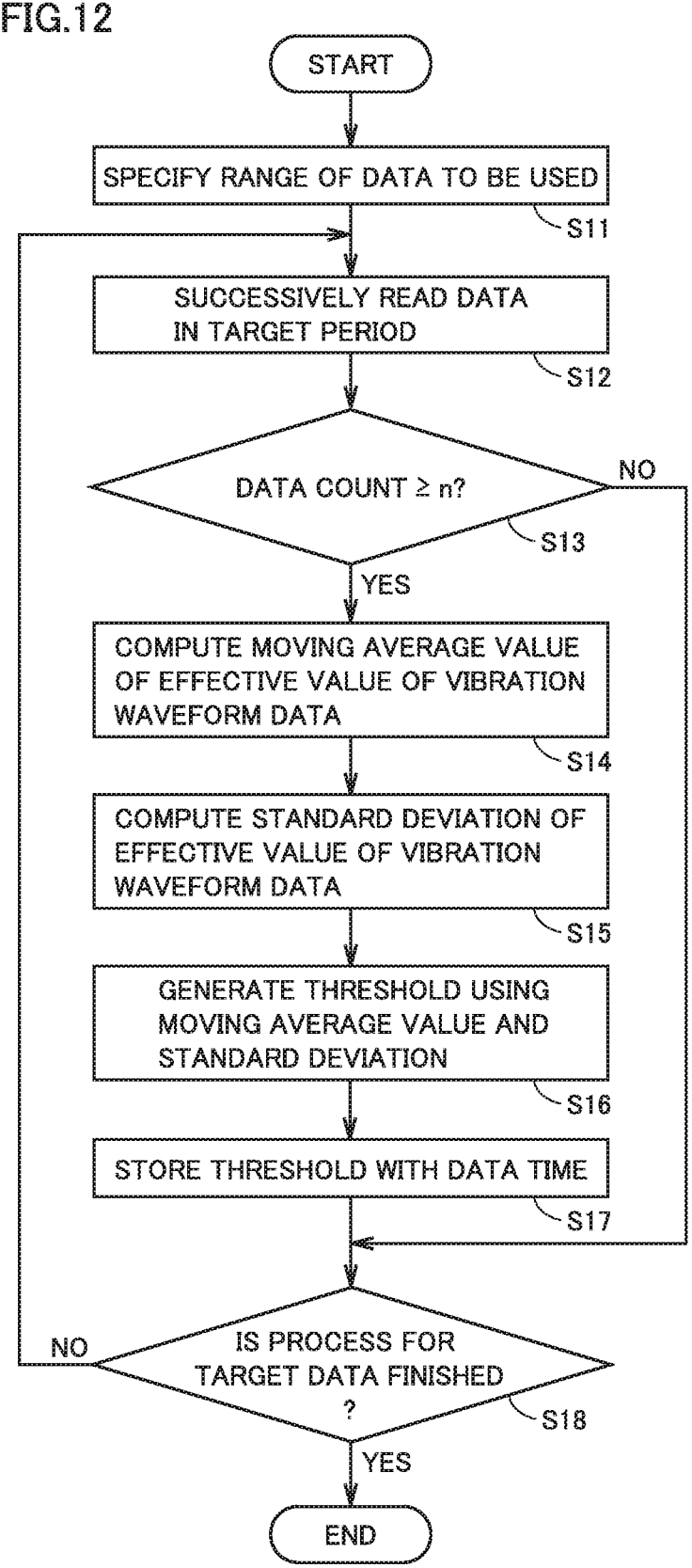
FIG. 12 is a flowchart illustrating a threshold setting process in the condition monitoring system according to the fourth embodiment.

FIG. 12 is a flowchart illustrating a threshold setting process in the condition monitoring system according to the fourth embodiment. The setting process shown in FIG. 12 is performed by data processor 80 (FIG. 9) with a data range (period) specified to be used in threshold calculation.

Referring to FIG. 12, at step S11, data processor 80 specifies the range of data to be used fir calculating a threshold. The range of data may be automatically set, for example, in the same month a year ago or may be given as a parameter from the outside via communication.

Next, at step S12, threshold setting unit 160 successively reads the vibration waveform data stored in storage unit 130 from the top of the specified data range.

At step S13, threshold setting unit 160 determines whether the data count of effective values of the read vibration waveform data is equal to or greater than n. If the data count of effective values of the read vibration waveform data is less than n (NO in the determination at S13), the subsequent processing S14 to S17 is skipped.

On the other hand, if the data count of effective values of the read vibration waveform data is equal to or greater than n (YES in the determination at S13), threshold setting unit 160 proceeds to step S14 and computes the moving average value of effective values of the read latest n pieces of vibration waveform data.

Subsequently, at step S15, threshold setting unit 160 computes the standard deviation of effective values of the read latest n pieces of vibration waveform data. Then, at step S16, threshold setting unit 160 sets a threshold using the moving average value computed at step S14 and the standard deviation computed at step S15. At step S17, threshold setting unit 160 successively stores the set threshold into threshold storage unit 168 (FIG. 9). The threshold is stored together with time information used for calculation and is used for selecting a threshold for use in diagnosis.

At step S18, threshold setting unit 160 determines whether the process is finished for all of vibration waveform data in the target period. If the process is not finished (NO in the determination at S18), the process returns to S12.

Figure 13:
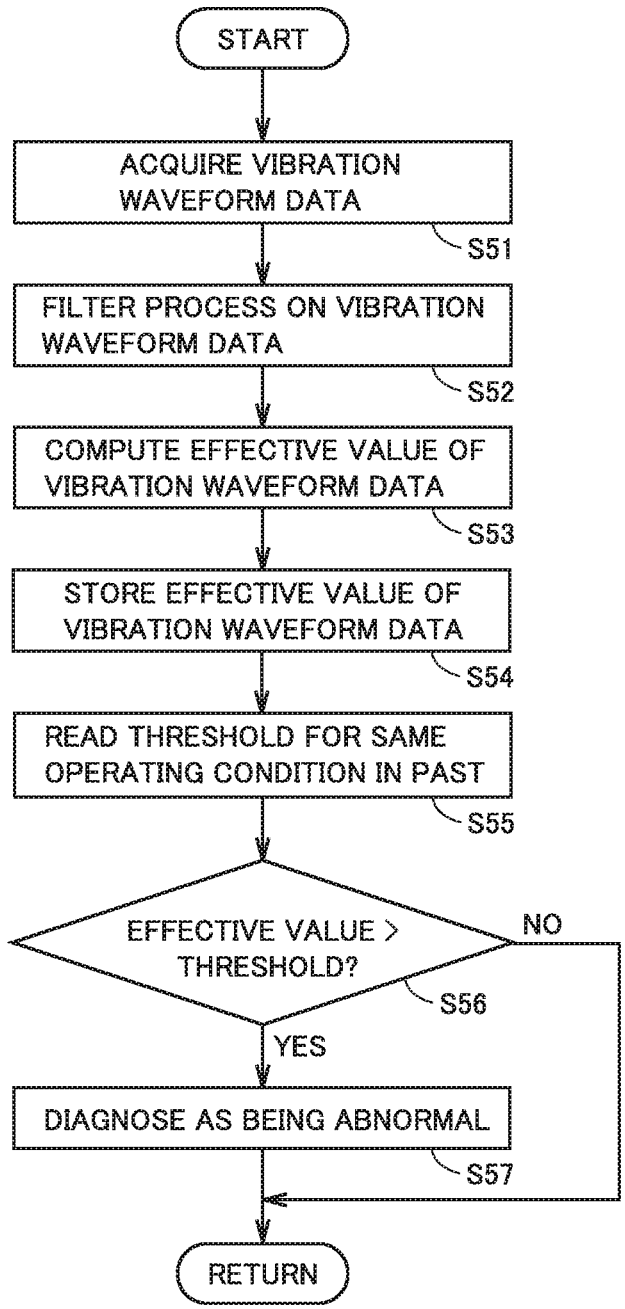
FIG. 13 is a flowchart illustrating a control process for diagnosing abnormality of bearing 60 in the condition monitoring system according to an embodiment.

FIG. 13 is a flowchart illustrating a control process for diagnosing abnormality of bearing 60 in the condition monitoring system according to the fourth embodiment. The control process shown in FIG. 13 is repeatedly performed by data processor 80 at predetermined time intervals.

Referring to FIG. 13, at step S51, data processor 80 receives vibration waveform data of bearing 60 from vibration sensor 70. At step S52, in data processor 80, BPF 112 performs a filter process on the vibration waveform data of bearing 60.

Next, at step S53, effective value computing unit 120 receives the vibration waveform data of bearing 60 subjected to a filter process from BPF 112 and then calculates the effective value of vibration waveform data of bearing 60. At step S54, storage unit 130 stores the effective value of vibration waveform data calculated by effective value computing unit 120.

At step S55, diagnosis unit 150 reads the threshold set based on the effective value of vibration waveform data in the past under the same condition as for the effective value of vibration waveform data from threshold storage unit 168 in setting unit 160. For example, diagnosis unit 150 reads the threshold set in the same time in the past as the present season.

At step S56, data processor 80 compares the effective value of vibration waveform data calculated at step S53 with the threshold read at step S55. If the effective value is equal to or smaller than the threshold (NO in the determination at S56), diagnosis unit 150 diagnoses bearing 60 as being normal and skips the subsequent processing S57. On the other hand, if the effective value is greater than the threshold (YES in the determination at S56), at step S57, diagnosis unit 150 diagnoses bearing 60 as being abnormal and issues an alarm.

In the foregoing fourth embodiment, vibration sensor 70 is installed at bearing 60, which is one of the mechanical components in wind turbine generation apparatus 10, to diagnose abnormality of bearing 60. However, the mechanical component to be diagnosed is not limited to bearing 60. This point is described for clarification. For example, a vibration sensor may be installed at a bearing provided in gearbox 40 or in generator 50 in addition to bearing 60 or in place of bearing 60, and abnormality of the bearing provided in gearbox 40 or in generator 50 may be diagnosed by a similar method as in the foregoing fourth embodiment.

In the foregoing fourth embodiment, data processor 80 corresponds to an embodiment of "processor" in the present invention, and threshold setting unit 160 and diagnosis unit 150 correspond to an embodiment of "setting unit" and "diagnosis unit", respectively, in the present invention. In the foregoing fourth embodiment, moving average computing unit 162, standard deviation computing unit 164, threshold computing unit 166, and threshold storage unit 168 correspond to an embodiment of "first computing unit", "second computing unit", "third computing unit", and "storage unit", respectively, in the present invention.

Fifth Embodiment

Figure 14:
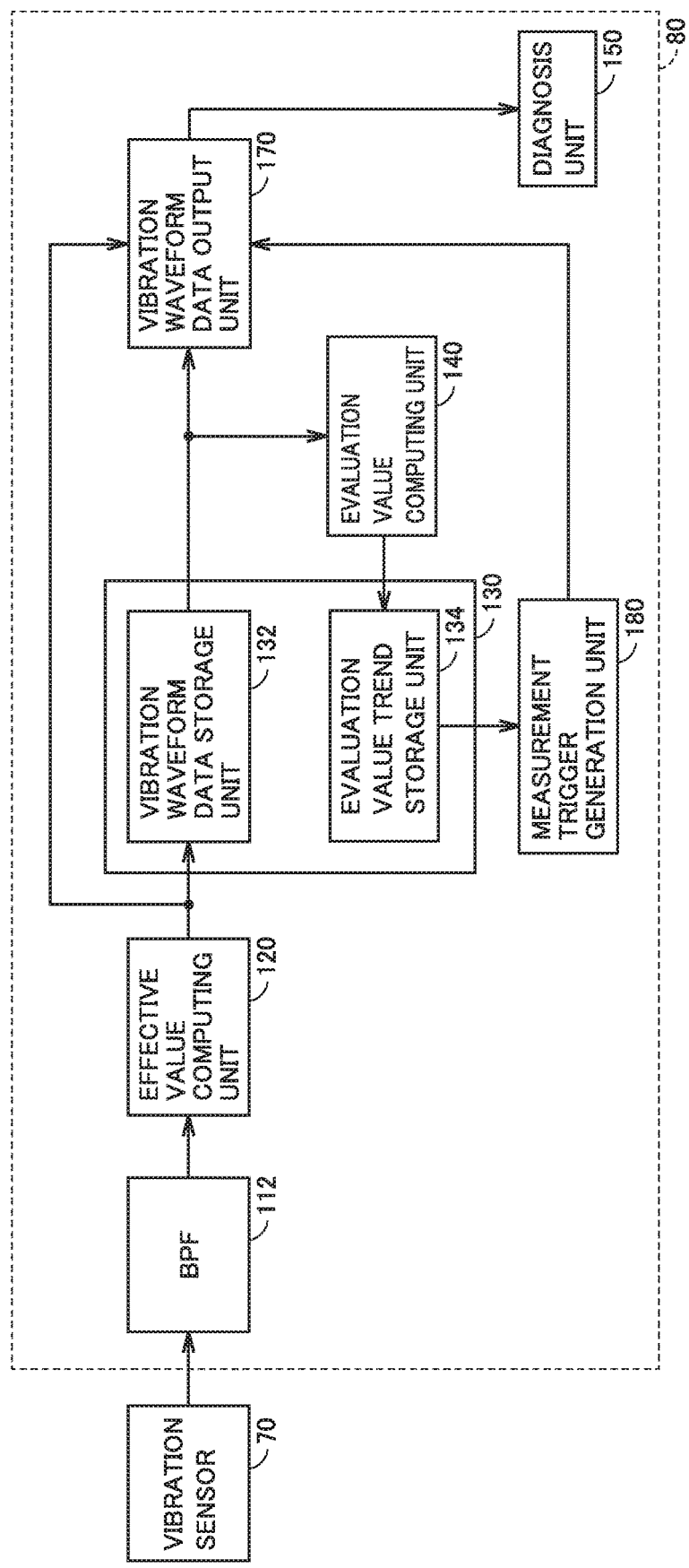
FIG. 14 is a functional block diagram showing the functional configuration of the data processor in the condition monitoring system according to a fifth embodiment.

FIG. 14 is a functional block diagram showing the functional configuration of data processor 80 in the condition monitoring system according to a fifth embodiment of the present invention. Referring to FIG. 14, data processor 80 includes a BPF 112, an effective value computing unit 120, a storage unit 130, a vibration waveform data output unit 170, a diagnosis unit 150, an evaluation value computing unit 140, and a measurement trigger generation unit 180.

BPF 112 receives vibration waveform data of bearing 60 from vibration sensor 70. BPF 112 includes, for example, an HPF. The HIT passes a signal component higher than a predetermined frequency to cut off a low frequency component of the received vibration waveform data. The HPF is provided for removing a direct-current component included in the vibration waveform data of bearing 60. The HPF may be omitted if the output of vibration sensor 70 does not include a direct-current component.

BPF 112 may include an LPF in addition to an HPF or in place of an HPF. The LPF passes a signal component lower than a predetermined frequency from the vibration waveform data.

In addition, an envelope process unit may be provided between vibration sensor 70 and BPF 112. The envelope process unit receives vibration waveform data of bearing 60 from vibration sensor 70 and then performs an envelope process on the received vibration waveform data to generate an envelope waveform of vibration waveform data of bearing 60. A variety of known techniques can be applied to the envelope process computed in the envelope process unit. As an example, the vibration waveform data of bearing 60 received from vibration sensor 70 is rectified to an absolute value and passed through an LPF to generate an envelope waveform of vibration waveform data of bearing 60.

In this case, in BPF 112, the HPF receives the envelope waveform of vibration waveform data of bearing 60 from the envelope process unit and then passes a signal component higher than a predetermined frequency to cut off a low frequency component of the received envelope waveform. That is, the HPF is configured to remove a direct-current component included in the envelope waveform and extract an alternating-current component of the envelope waveform.

Effective value computing unit 120 receives the vibration waveform data of bearing 60 subjected to a filter process from BPF 112. Effective value computing unit 120 calculates the effective value (RMS value) of vibration waveform data of bearing 60 and outputs the calculated effective value of vibration waveform data to storage unit 130.

Since the effective value of vibration waveform of bearing 60 computed by effective value computing unit 120 is an effective value of a raw vibration waveform that does not undergo an envelope process, tier example, an increase of the value is small for impulse-like vibration which increases only when the rolling element passes through a place where flaking occurs in part of the raceway of bearing 60, whereas an increase of the value is large for continuous vibration occurring in the case of smearing of the contact surface between the raceway and the rolling element or poor lubrication.

On the other hand, as described above, when the envelope process unit is provided, the effective value of the alternating-current component of the envelope waveform computed by effective value computing unit 120 shows a small increase for continuous vibration occurring in the case of smearing of the raceway or poor lubrication and shows a large increase for impulse-like vibration.

Storage unit 130 includes a vibration waveform data storage unit 132 and an evaluation value trend storage unit 134. Vibration waveform data storage unit 132 and evaluation value trend storage unit 134 are configured with, for example, a writable nonvolatile memory.

Vibration waveform data storage unit 132 stores the effective value of vibration waveform data of bearing 60 computed by effective value computing unit 120, from hour to hour. Vibration waveform data storage unit 132 is configured to store the effective value of vibration waveform data of bearing 60 within a certain time. As will be described later, the effective value of vibration waveform data of bearing 60 stored in vibration waveform data storage unit 132 is read, and abnormality of bearing 60 is diagnosed using the read effective value. In the following description, the effective value of vibration waveform data is simply referred to as "vibration waveform data".

Evaluation value computing unit 140 reads the vibration waveform data of bearing 60 within a certain time from vibration waveform data storage unit 132 and computes an evaluation value that characterizes the read vibration waveform data of bearing 60 within a certain time. Evaluation value computing unit 140 is configured to time-sequentially compute the evaluation value.

Evaluation value trend storage unit 134 receives the evaluation value computed by evaluation value computing unit 140. Evaluation value trend storage unit 134 stores the evaluation value applied from evaluation value computing unit 140 from hour to hour. In other words, evaluation value trend storage unit 134 is configured to store an evaluation value trend that indicates the tendency of temporal change of the evaluation value.

Figure 15:
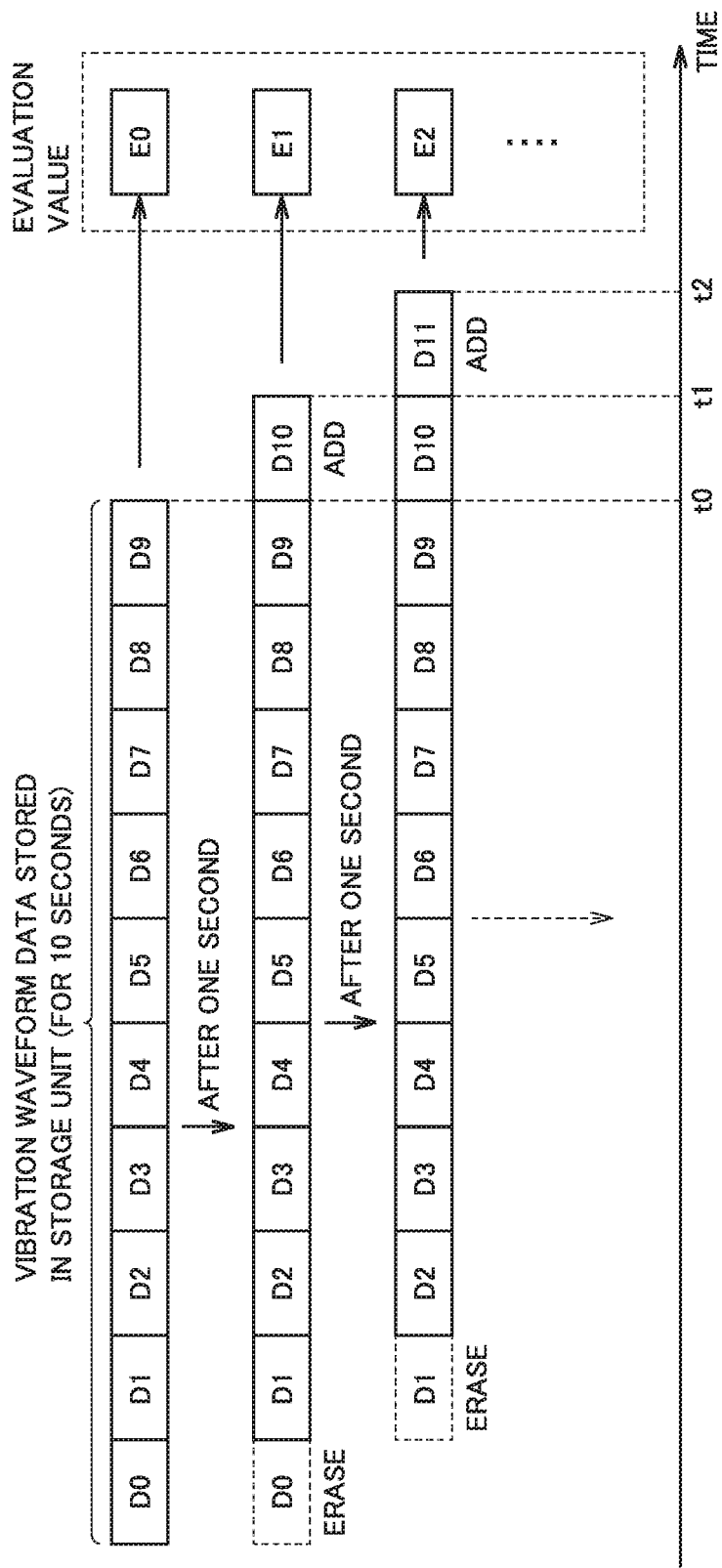
FIG. 15 is a diagram illustrating the operation of a vibration waveform data storage unit and an evaluation value computing unit shown in FIG. 14.

FIG. 15 is a diagram illustrating the operation of vibration waveform data storage unit 132 and evaluation value computing unit 140 shown in FIG. 14. Referring to FIG. 15, vibration waveform data storage unit 132 receives vibration waveform data of bearing 60 from effective value computing unit 120 at predetermined time intervals. In the example in FIG. 15, a predetermined time interval is one second. D0 to D11 in FIG. 15 represent vibration waveform data applied to vibration waveform data storage unit 132 at one-second intervals.

Vibration waveform data storage unit 132 stores vibration waveform data of bearing 60 within a certain time. The certain time can be set in accordance with the rotational speed of main shaft 20. In the example in FIG. 15, the certain time is 10 seconds. For example, at time t0, vibration waveform data storage unit 132 stores a total of 10 pieces of (that is, for 10 seconds) vibration waveform data D0 to D9 in time sequence.

At time t1 one second after time t0, vibration waveform data storage unit 132 receives vibration waveform data D10 from effective value computing unit 120 and then erases the oldest vibration waveform data D0 of vibration waveform data D0 to D9 for 10 seconds and adds the newly input vibration waveform data D10 to update the vibration waveform data within a certain time.

At time t2 one second after time t1, vibration waveform data storage unit 132 erases the oldest vibration waveform data D1 of vibration waveform data D1 to D10 for 10 seconds and adds the newly input vibration waveform data D11 to update the vibration waveform data of bearing 60 within a certain time.

In this way, vibration waveform data storage unit 132 updates the vibration waveform data of bearing 60 within a certain time, at predetermined time intervals. Evaluation value computing unit 140 reads the vibration waveform data of bearing 60 within a certain time updated at predetermined time intervals from vibration waveform data storage unit 132. Evaluation value computing unit 140 statistically processes the read vibration waveform data of bearing 60 within a certain time to compute an evaluation value.

In the example in FIG. 15, at time t0, evaluation value computing unit 140 reads vibration waveform data D0 to D9 for 10 seconds from vibration waveform data storage unit 132 and then statistically processes the read vibration waveform data D0 to D9 to compute evaluation value E0. Evaluation value E0 is a value (representative value) that characterizes vibration waveform data D0 to D9 for 10 seconds immediately before time t0. In the statistical processing, therefore, for example, the average value of vibration waveform data D0 to D9 can be computed as evaluation value E0. Alternatively, for example, the median, mode, or minimum of vibration waveform data D0 to D9 may be computed as evaluation value E0.

At time t1, evaluation value computing unit 140 statistically processes vibration waveform data D1 to D10 for 10 seconds to compute evaluation value E1. At time t2, evaluation value computing unit 140 statistically processes vibration waveform data D2 to D11 for 10 seconds to compute evaluation value E2.

In this way, evaluation value computing unit 140 computes the evaluation value of vibration waveform data of bearing 60 within a certain time, at predetermined time intervals. Evaluation value computing unit 140 outputs the computed evaluation value to evaluation value trend storage unit 134.

Figure 16:
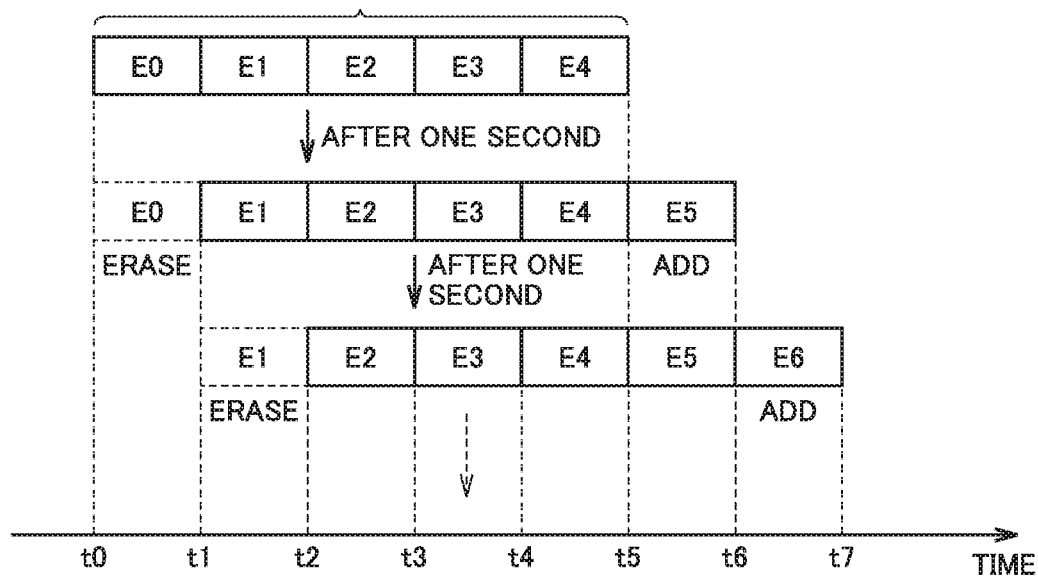
FIG. 16 is a diagram illustrating the operation of an evaluation value trend storage unit shown in FIG. 14.

FIG. 16 is a diagram illustrating the operation of evaluation value trend storage unit 134 shown in FIG. 14. Referring to FIG. 16, evaluation value trend storage unit 134 receives evaluation values from evaluation value computing unit 140 at predetermined time intervals. In the example in FIG. 16, a predetermined time interval is one second. E0 to E6 in FIG. 16 represent evaluation values applied from evaluation value computing unit 140 to evaluation value trend storage unit 134 at one-second intervals.

Evaluation value trend storage unit 134 stores a predetermined number of evaluation values in time sequence. A predetermined number of evaluation values in time sequence correspond to "evaluation value trend" representing the tendency of temporal change of evaluation value.

In the example in FIG. 16, the predetermined number is live. For example, evaluation value trend storage unit 134 stores evaluation value E0 at time t0, stores evaluation value E1 at time t1 one second after time t0, stores evaluation value E2 at time t2 one second after time t1, stores evaluation value E3 at time t3 one second after time t2, and stores evaluation value E4 at time t4 one second after time t3. Evaluation value E3 is computed by statistically processing vibration waveform data D3 to D12 for 10 seconds immediately before time t3. Evaluation value E4 is computed by statistically processing vibration waveform data D4 to D13 for 10 seconds immediately before time t4.

In the example in FIG. 16, for example, at time t5, evaluation value trend storage unit 134 stores a total of five evaluation values E0 to E4. At time t6 one second after time t5, evaluation value trend storage unit 134 receives evaluation value E5 of vibration waveform data D5 to D14 for 10 seconds immediately before time t5 from evaluation value computing unit 140 and then erases the oldest evaluation value E0 of a total of five evaluation values E0 to E4 and adds the newly input evaluation value E5 to update a predetermined number of evaluation values.

Further, at time t6 one second after time t5, evaluation value trend storage unit 134 receives evaluation value E6 of vibration waveform data D6 to D15 for 10 seconds immediately before time t6 from evaluation value computing unit 140 and then erases the oldest evaluation value E1 of a total of five evaluation values E1 to E5 and adds the newly input evaluation value E6 to update a predetermined number of evaluation values.

In this way, evaluation value trend storage unit 134 updates a predetermined number of evaluation values in time sequence (evaluation value trend), at predetermined time intervals.

Returning to FIG. 14, measurement trigger generation unit 180 reads a predetermined number of evaluation values in time sequence (evaluation value trend) from evaluation value trend storage unit 134 and then generates a trigger (hereinafter also referred to as "measurement trigger") for starting measurement of vibration waveform data, based on the read evaluation value trend. Measurement trigger generation unit 180 outputs the generated measurement trigger to vibration waveform data output unit 170.

Figure 17:
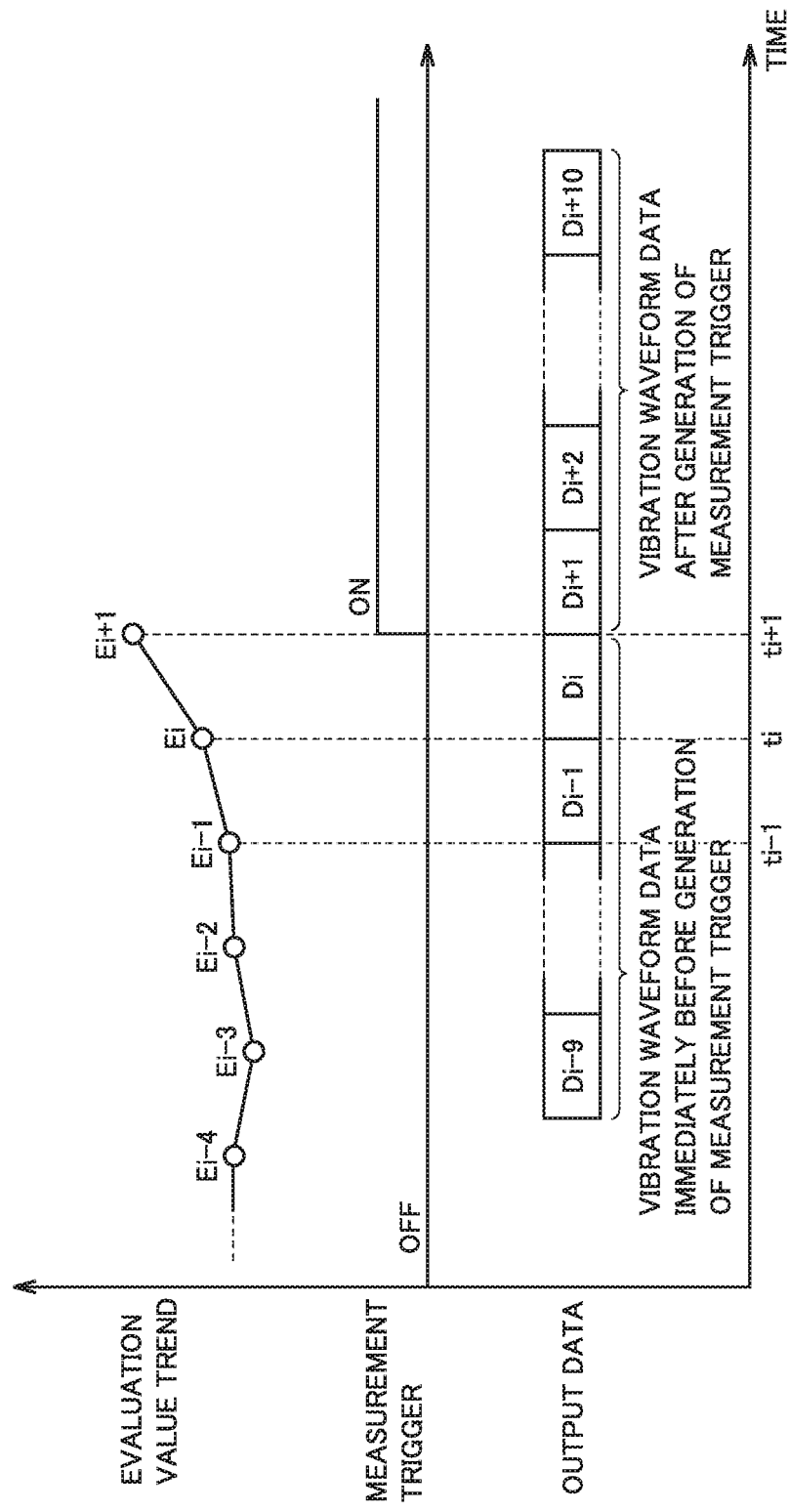
FIG. 17 is a diagram illustrating the operation of a measurement trigger generation unit and a vibration waveform data output unit shown in FIG. 14.

FIG. 17 is a diagram illustrating the operation of measurement trigger generation unit 180 and vibration waveform data output unit 170 shown in FIG. 14. FIG. 17 shows an example of the evaluation value trend stored in evaluation value trend storage unit 134, the measurement trigger generated from measurement trigger generation unit 180 based on the evaluation value trend, and the vibration waveform data of bearing 60 output from vibration waveform data output unit 170.

Ei−4, Ei−3, . . . , Ei, Ei+1 in FIG. 17 represent evaluation values applied to evaluation value trend storage unit 134 at predetermined time intervals. In the example in FIG. 17, the predetermined time interval is one second. Ei indicates the evaluation value applied to evaluation value trend storage unit 134 at time ti, Ei−1 indicates the evaluation value applied to evaluation value trend storage unit 134 at time ti−1, and Ei+1 indicates the evaluation value applied to evaluation value trend storage unit 134 at time ti+1.

Measurement trigger generation unit 180 determines whether the evaluation value trend representing the tendency of temporal change of evaluation value has changed. If it is determined that the evaluation value trend has changed, measurement trigger generation unit 180 generates a measurement trigger. Specifically, measurement trigger generation unit 180 determines whether the evaluation value trend has changed, based on the temporal change rate of evaluation value, that is, the amount of change in unit time.

In the example in FIG. 17, when evaluation value Ei is stored in evaluation value trend storage unit 134 at time ti, measurement trigger generation unit 180 computes the temporal change rate of evaluation value, based on the difference between evaluation value Ei at time ti and evaluation value Ei+1 at time ti+1. Letting the temporal change rate of evaluation value at time ti be dEi, dEi is written as Equation (2).

$$dEi=(Ei-Ei+1)/(ti-ti+1) \qquad (2)$$

Measurement trigger generation unit 180 compares the computed temporal change rate dEi with a predetermined threshold α. If temporal change rate dEi is equal to or greater than threshold α, measurement trigger generation unit 180 sets the measurement trigger ON. On the other hand, if temporal change rate dEi is smaller than threshold α, measurement trigger generation unit 180 sets the measurement trigger OFF. FIG. 17 shows temporal change rate dEi+1 equal to or greater than threshold α at time ti+1. In this case, at time ti+1, measurement trigger generation unit 180 switches the measurement trigger OFF to ON. Measurement trigger generation unit 180 outputs the measurement trigger to vibration waveform data output unit 170.

Vibration waveform data output unit 170 receives the measurement trigger from measurement trigger generation unit 180 and then reads vibration waveform data of bearing 60 within a certain time stored in vibration waveform data storage unit 132. This vibration waveform data of bearing 60 within a certain time corresponds to the vibration waveform data of bearing 60 within a certain time immediately before the point of time when the measurement trigger is generated. In the example in FIG. 17, vibration waveform data Di−9 to Di for 10 seconds immediately before time ti−1 are read from vibration waveform data storage unit 132.

Vibration waveform data output unit 170 further receives vibration waveform data of bearing 60 after time ti+1 from effective value computing unit 120. In the example in FIG. 17, vibration waveform data output unit 170 receives vibration waveform data. Di+1 to Di+10 for 10 seconds after time ti+1 from effective value computing unit 120.

Vibration waveform data output unit 170 outputs vibration waveform data Di−9 to Di of bearing 60 within a certain time immediately before certain time ti+1 at the point of time when the measurement trigger is generated and vibration waveform data Di+1 to Di+10 of bearing 60 after certain time ti+1 at the point of time when the measurement trigger is generated, altogether to diagnosis unit 150.

Diagnosis unit 150 receives vibration waveform data. Di−9 to Di+10 of bearing 60 altogether and then diagnoses abnormality of bearing 60 based on the received data. That is, diagnosis unit 150 is configured to start measurement of vibration waveform data when a measurement trigger is generated due to change of the tendency of temporal change of evaluation value.

As described above, in the condition monitoring system according, to the fifth embodiment, an evaluation value that characterizes the vibration waveform data within a certain time is computed, and when the temporal change rate of evaluation value indicating the tendency of temporal change of this evaluation value changes, a trigger for starting measurement of vibration waveform data is generated. In this way, a trigger can be generated based on the evaluation value from which the effect of noise superimposed on the vibration waveform data is eliminated appropriately. This prevents frequent generation of a trigger due to the effect of noise. As a result, vibration waveform data when bearing 60 is failed can be measured reliably and efficiently, thereby providing accurate abnormality diagnosis.

Here, vibration waveform data Di−9 to Di+10 of bearing 60 applied altogether to diagnosis unit 150 correspond to the vibration waveform data of bearing 60 acquired in the vicinity of the point of time when a measurement trigger is generated, that is, the point of time when the tendency of temporal change of evaluation value changes. Therefore, diagnosis unit 150 can analyze these vibration waveform data to retrospectively inspect the state of bearing 60 before and after the point of time when the tendency of temporal change of evaluation value changes.

Vibration waveform data storage unit 132 is configured to store the vibration waveform data of bearing 60 within a certain time immediately before the point of time when a measurement trigger is generated and to erase the vibration waveform data of bearing 60 when a measurement trigger is not generated. In this configuration, vibration waveform data storage unit 132 has a storage capacity that only stores data useful for retrospective inspection, thereby avoiding too large storage capacity of the memory contained in data processor 80.

In data processor 80, vibration waveform data storage unit 132 and evaluation value trend storage unit 134 may be configured with a memory independent of the storage unit for storing the vibration waveform data output from effective value computing unit 120 from hour to hour. This configuration facilitates addition and removal of vibration waveform data storage unit 132 and evaluation value trend storage unit 134, depending on the application and situation of wind turbine generation apparatus 10.

Figure 18:
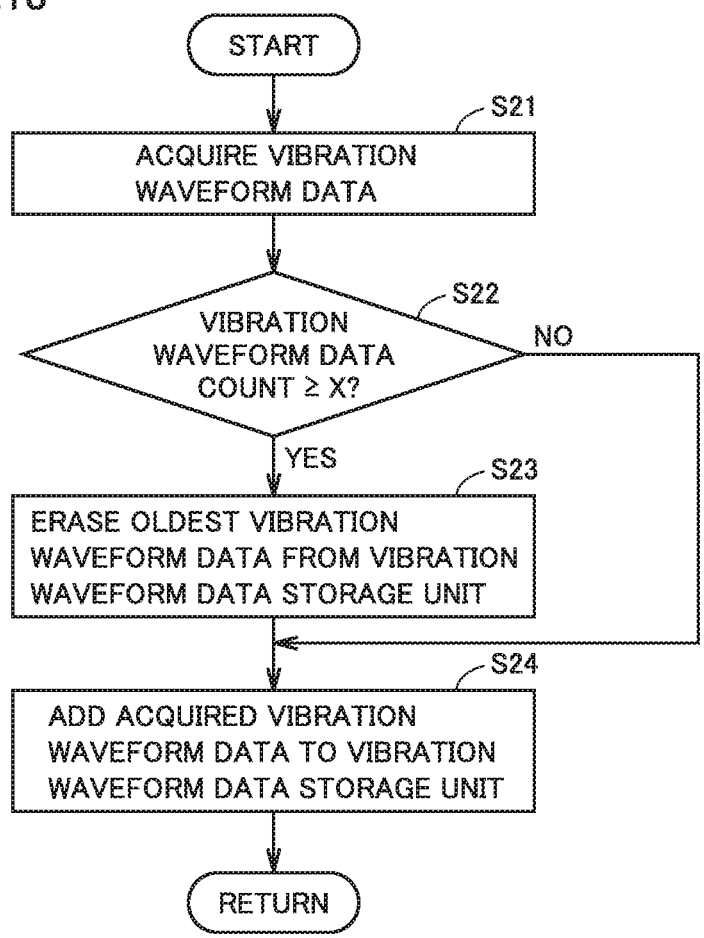
FIG. 18 is a flowchart illustrating a control process for storing vibration waveform data of the bearing in the condition monitoring system according to the fifth embodiment.
Figure 19:
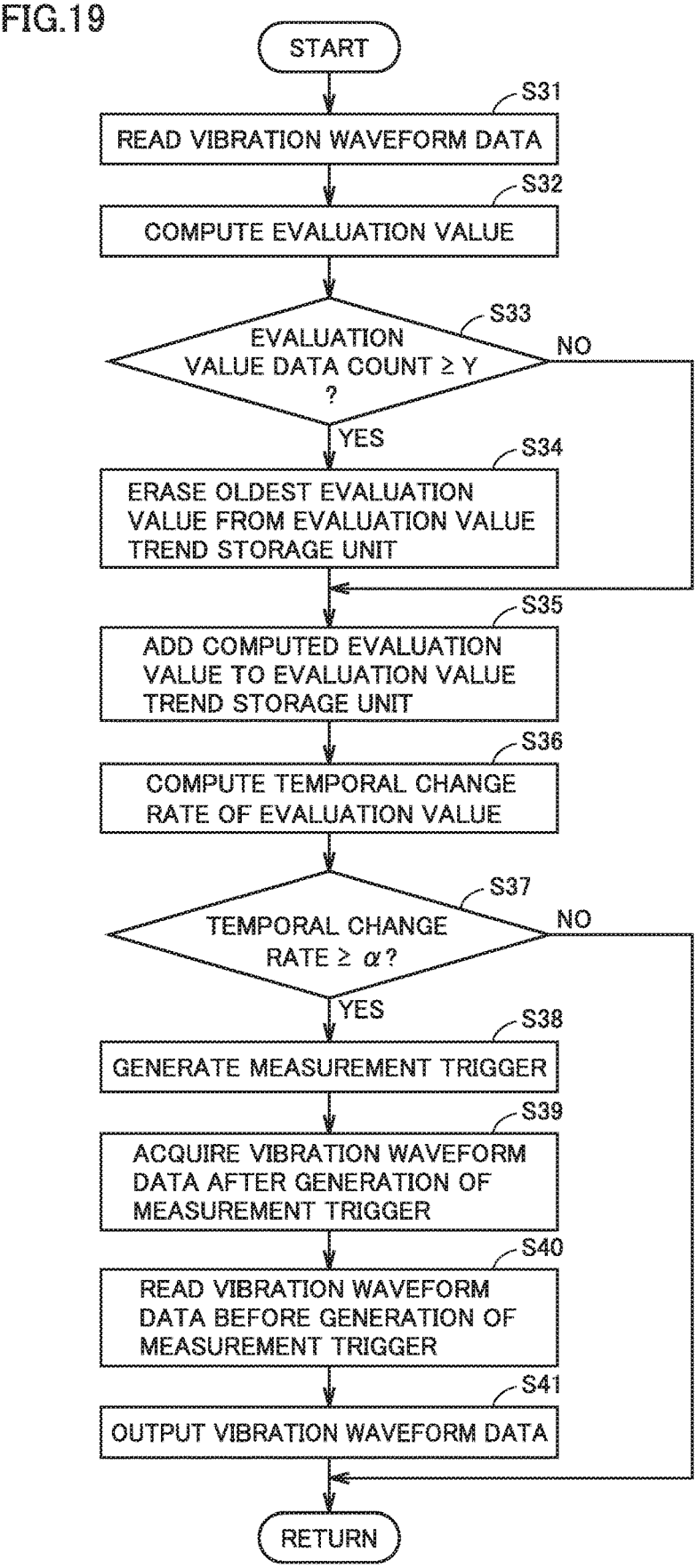
FIG. 19 is a flowchart illustrating a control process for generating a measurement trigger for vibration waveform data of the bearing in the condition monitoring system according to the fifth embodiment.

Referring now to FIG. 18 and FIG. 19, a control process for diagnosing abnormality of bearing 60 in the condition monitoring system according to the fifth embodiment will be described.

FIG. 18 is a flowchart illustrating a control process for storing vibration waveform data of bearing 60 in the condition monitoring system according to the fifth embodiment. The control process shown in FIG. 18 is repeatedly performed by vibration waveform data storage unit 132 at predetermined time intervals. For example, in the example in FIG. 15, the control process shown in FIG. 18 is repeatedly performed at one-second intervals.

Referring to FIG. 18, at step S21, vibration waveform data storage unit 132 receives vibration waveform data of bearing 60 from effective value computing unit 120. At step S22, vibration waveform data storage unit 132 determines whether the number of pieces of stored vibration waveform data of bearing 60 is equal to or greater than a predetermined number X. This predetermined number X is equivalent to the number of pieces of vibration waveform data of bearing 60 acquired within a certain time. In the example in FIG. 15, since the certain time is 10 seconds, predetermined number X is set to "10" which is a value obtained by dividing the certain time by the predetermined time interval.

If the number of pieces of stored vibration waveform data of bearing 60 is equal to or greater than predetermined number X (YES in the determination at S22), vibration waveform data storage unit 132 proceeds to step S23 and erases the oldest vibration waveform data of predetermined number X of vibration waveform data. Then, at step S24, vibration waveform data storage unit 132 adds the vibration waveform data acquired at step S21.

On the other hand, if the number of pieces of stored vibration waveform data of bearing 60 is smaller than predetermined number X (NO in the determination at S22), vibration waveform data storage unit 132 proceeds to step S24 and adds the vibration waveform data acquired at step S21. In this way, vibration waveform data storage unit 132 updates the vibration waveform data within a certain time, at predetermined time intervals.

FIG. 19 is a flowchart illustrating a control process for generating a measurement trigger fix vibration waveform data of bearing 60 in the condition monitoring system according to the fifth embodiment. The control process shown in FIG. 19 is performed by evaluation value computing unit 140, evaluation value trend storage unit 134, measurement trigger generation unit 180, and vibration waveform data output unit 170 at predetermined time intervals.

Referring to FIG. 19, at step S31, evaluation value computing unit 140 reads the vibration waveform data of bearing 60 within a certain time from vibration waveform data storage unit 132.

At step S32, evaluation value computing unit 140 statistically processes the vibration waveform data of bearing 60 within a certain time read at step S31 to compute the evaluation value of vibration waveform data of bearing 60 within a certain time. Evaluation value computing unit 140 outputs the computed evaluation value to evaluation value trend storage unit 134.

At step S33, evaluation value trend storage unit 134 determines whether the data count of stored evaluation values is equal to or greater than a predetermined number Y. This predetermined number Y corresponds to the data count necessary for acquiring the evaluation value trend representing the tendency of temporal change of evaluation value. Predetermined number Y is set to a number equal to or greater than two. In the example in FIG. 15, predetermined number Y is set to five.

If the data count of stored evaluation values is equal to or greater than predetermined number Y (YES in the determination at S33), evaluation value trend storage unit 134 proceeds to step S34 and erases the oldest evaluation value of predetermined number Y of evaluation values. Then, at step S35, evaluation value trend storage unit 134 adds the evaluation value computed at step S32.

On the other hand, if the data count of stored evaluation values is smaller than predetermined number Y (NO in the determination at S33), evaluation value trend storage unit 134 proceeds to step S35 and adds the evaluation value computed at step S32. In this way, evaluation value trend storage unit 134 updates predetermined number Y of evaluation values at predetermined time intervals.

At step S36, measurement trigger generation unit 180 reads predetermined number Y of evaluation values in time sequence (evaluation value trend) from evaluation value trend storage unit 134 and then computes the temporal change rate of evaluation value in the read evaluation value trend. At step S36, measurement trigger generation unit 180 reads the evaluation value added at step S35 and the evaluation value added immediately before this evaluation value from evaluation value trend storage unit 134. Then, measurement trigger generation unit 180 computes the temporal change rate of evaluation value based on the difference between two read evaluation values, using Equation (2) above.

At step S37, measurement trigger generation unit 180 compares the temporal change rate of evaluation value computed at step S36 with threshold $\alpha$. If the temporal change rate of evaluation value is smaller than threshold $\alpha$ (NO in the determination at S37), the subsequent processing S38 to S31 is skipped. On the other hand, if the temporal change rate of evaluation value is equal to or greater than threshold $\alpha$ (YES in the determination at S37), at step S38, measurement trigger generation unit 180 generates a measurement trigger and outputs the generated measurement trigger to vibration waveform data output unit 170.

Vibration waveform data output unit 170 receives a measurement trigger from measurement trigger generation unit 180 and then, at step S39, reads the vibration waveform data of bearing 60 after the point of time when the measurement trigger is generated that is stored in vibration waveform data storage unit 132 from hour to hour.

At step S40, vibration waveform data output unit 170 reads the vibration waveform data of bearing 60 within a certain time stored in vibration waveform data storage unit 132. As explained with reference to FIG. 17, this vibration waveform data of bearing 60 within a certain time corresponds to the vibration waveform data of bearing 60 within a certain time immediately before the point of time when the measurement trigger is generated.

At step S41, vibration waveform data output unit 170 outputs the vibration waveform data of bearing 60 within a certain time immediately before the point of time when the measurement trigger is generated, read at step S40, and the vibration waveform data of bearing 60 after the point of time when the measurement trigger is generated, acquired at step S39, altogether to diagnosis unit 150. Thus, diagnosis unit 150 diagnoses abnormality of bearing 60 using the vibration waveform data of bearing 60 altogether.

Modification to Fifth Embodiment

In the foregoing fifth embodiment, the temporal change rate (for example, $dEi$ in FIG. 17) between two evaluation values in time sequence (for example, evaluation values $Ei-1$ and $Ei$ in FIG. 17) is calculated, and a measurement trigger is generated based on the result of comparison between the computed temporal change rate and threshold α. However, in this configuration, if noise is superimposed on one of two evaluation values, the temporal change rate of evaluation value may temporarily exceed threshold α due to the effect of this noise. In such a case, measurement trigger generation unit 180 may erroneously generate a measurement trigger.

Then, in order to avoid erroneous generation of a measurement trigger due to the effect of noise, measurement trigger generation unit 180 can be configured to generate a measurement trigger when the determination result that the temporal change rate of evaluation value is equal to or greater than threshold α occurs multiple times in succession. For example, in the example in FIG. 17, if both of temporal change rate $dE_{i+1}$ at time $t_{i+1}$ and temporal change rate $dE_{i+2}$ at time $t_{i+2}$ are determined to be equal to or greater than threshold α, measurement trigger generation unit 180 may generate a measurement trigger.

In this configuration, if temporal change rate $dE_{i+1}$ at time $t_{i+1}$ is equal to or greater than threshold α and temporal change rate $dE_{i+2}$ at time $t_{i+2}$ is smaller than threshold α, measurement trigger generation unit 180 does not generate a measurement trigger. Since the increase of temporal change rate $dE_{i+1}$ is considered as being temporary due to the effect of noise, erroneous generation of a measurement trigger can be prevented.

Sixth Embodiment

In the foregoing fifth embodiment, a measurement trigger is generated by determining that the tendency of temporal change of evaluation value of vibration waveform data of bearing 60 within a certain time has changed, based on the temporal change rate of evaluation value. In a sixth embodiment, a measurement trigger is generated by determining that the tendency of temporal change of evaluation value has changed, based on the magnitude of evaluation value.

Figure 20:
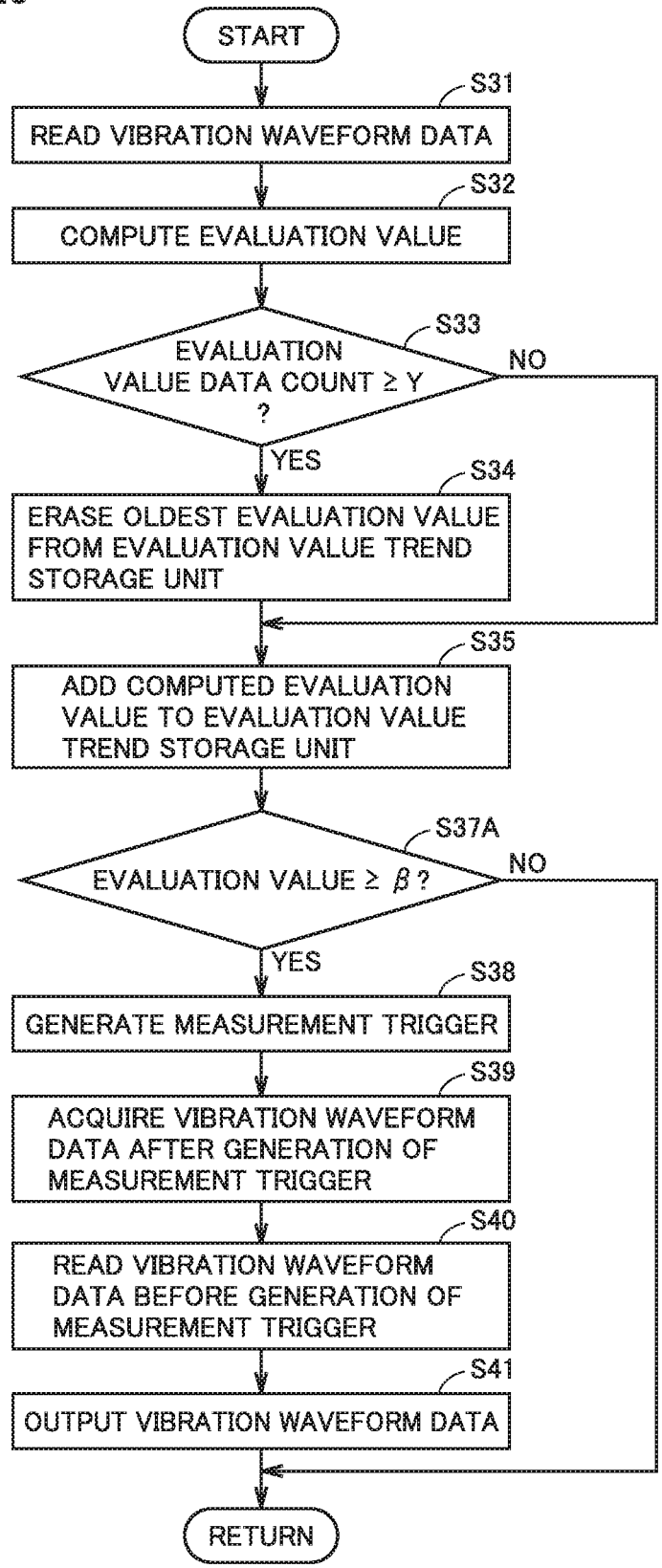
FIG. 20 is a flowchart illustrating a control process for generating a measurement trigger for vibration waveform data of the bearing in the condition monitoring system according to a sixth embodiment.

FIG. 20 is a flowchart illustrating a control process for generating a measurement trigger for vibration waveform data of bearing 60 in the condition monitoring system according to the sixth embodiment. The control process shown in FIG. 20 is repeatedly performed by evaluation value computing unit 140, evaluation value trend storage unit 134, measurement trigger generation unit 180, and vibration waveform data output unit 170 at predetermined time intervals.

FIG. 20 differs from FIG. 19 in that in the condition monitoring system according to the sixth embodiment, step S37A is performed in place of steps S36 and S37 after the processing at steps S31 to S35 similar to those in FIG. 19.

That is, at step S35, evaluation value trend storage unit 134 adds the evaluation value computed at step S32, and then at step S37A, measurement trigger generation unit 180 compares the evaluation value added at step S35 with threshold β. If the evaluation value is smaller than threshold β (NO in the determination at S37A), the subsequent processing S38 to S41 is skipped. On the other hand, if the evaluation value is equal to or greater than threshold β (YES in the determination at S37A), measurement trigger generation unit 180 generates a measurement trigger through the processing at step S38 similar to that in FIG. 19.

Vibration waveform data output unit 170 performs the processing at steps S39 to S41 similar to those in FIG. 19 to output the vibration waveform data of bearing 60 within a certain time immediately before the point of time when the measurement trigger is generated and the vibration waveform data of bearing 60 after the point of time when the measurement trigger is generated, altogether to diagnosis unit 150.

As described above, according to the sixth embodiment, an evaluation value that characterizes the vibration waveform data within a certain time is computed, and when the magnitude of this evaluation value is equal to or greater than threshold β, it is determined that the tendency of temporal change of evaluation value has changed, and a trigger for starting measurement of vibration waveform data is generated. With this configuration, a trigger can be generated based on the evaluation value from which the effect of noise superimposed on the vibration waveform data is eliminated appropriately. The sixth embodiment therefore also can achieve the similar effects as in the fifth embodiment.

Modification to Sixth Embodiment

In the foregoing sixth embodiment, a measurement trigger is generated based on the result of comparison with the evaluation value and threshold β. However, in this configuration, when the evaluation value is temporarily equal to or greater than threshold β due to noise superimposed on the evaluation value, measurement trigger generation unit 180 may erroneously generate a measurement trigger.

In order to prevent erroneous generation of a measurement trigger due to the effect of noise, measurement trigger generation unit 180 can be configured to generate a measurement trigger when the determination result that the evaluation value is equal to or greater than threshold β occurs multiple times in succession. For example, in the example in FIG. 17, if both of evaluation value $E_{i+1}$ at time $t_{i+1}$ and evaluation value $E_{i+2}$ at time $t_{i+2}$ are determined to be equal to or greater than threshold β, measurement trigger generation unit 180 may generate a measurement trigger.

In this configuration, when evaluation value $E_{i+1}$ at time $t_{i+1}$ is equal to or greater than threshold β and evaluation value $E_{i+2}$ at time $t_{i+2}$ is smaller than threshold β, measurement trigger generation unit 180 does not generate a measurement trigger. Since the increase of evaluation value $E_{i+1}$ is considered as being temporary due to the effect of noise, erroneous generation of a measurement trigger can be prevented.

Seventh Embodiment

In a seventh embodiment, a measurement trigger is generated by determining that the tendency of temporal change of evaluation value has changed, based on the temporal change rate and the magnitude of evaluation value.

Figure 21:
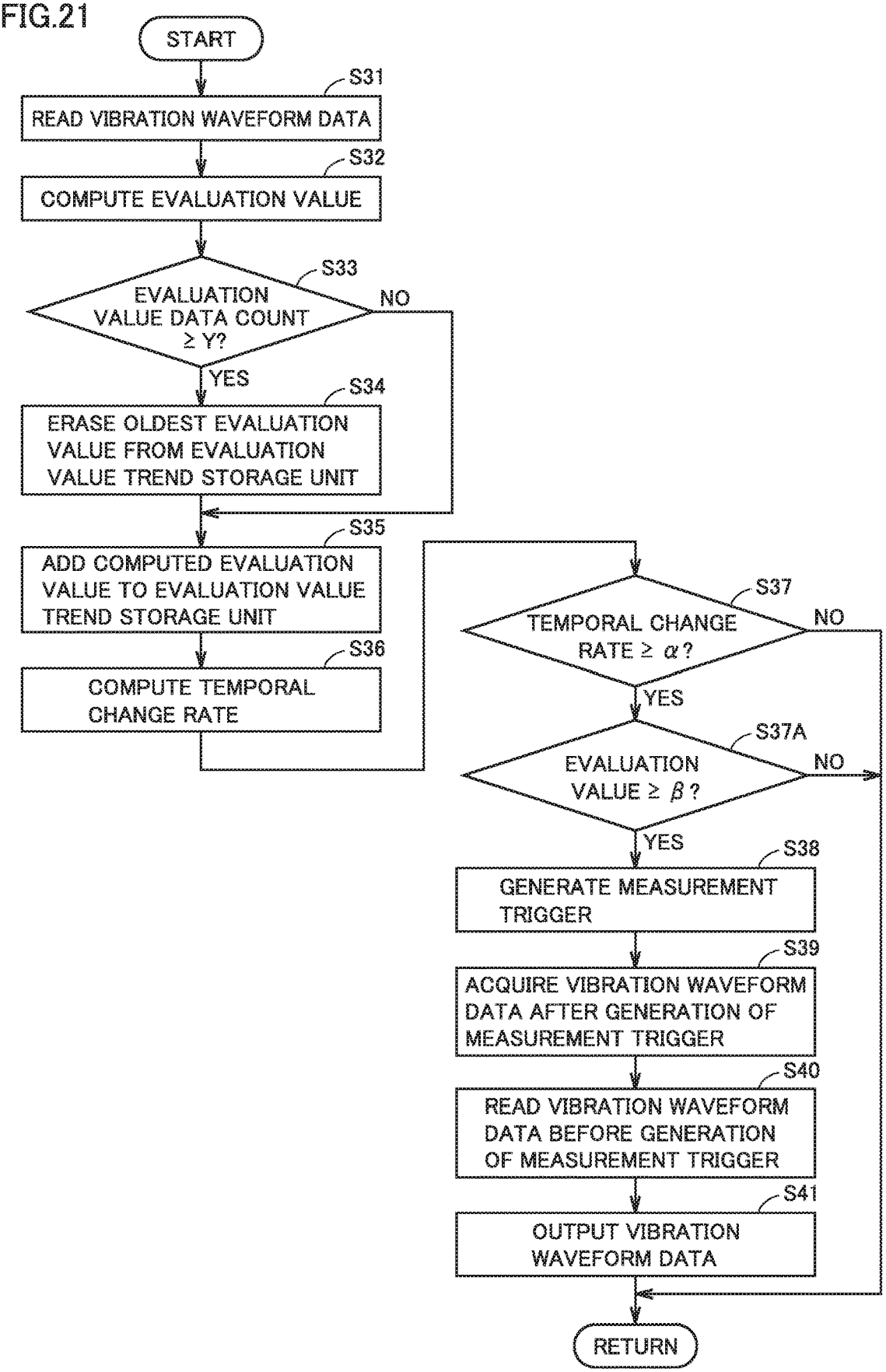
FIG. 21 is a flowchart illustrating a control process for generating a measurement trigger for vibration waveform data of the bearing in the condition monitoring system according to a seventh embodiment.

FIG. 21 is a flowchart illustrating a control process for generating a measurement trigger for vibration waveform data of bearing 60 in the condition monitoring system according to the seventh embodiment. The control process shown inn FIG. 21 is repeatedly performed by evaluation value computing unit 140, evaluation value trend storage unit 134, measurement trigger generation unit 180, and vibration waveform data output unit 170 at predetermined time intervals.

FIG. 21 differs from FIG. 19 in that in the condition monitoring system according to the seventh embodiment, step S37A is performed in addition to step S37 after the processing at steps S31 to S36 similar to those in FIG. 19.

That is, at step S35, evaluation value trend storage unit 134 adds the evaluation value computed at step S32, and then at step S37, measurement trigger generation unit 180 compares the temporal change rate of evaluation value computed at step S36 with threshold α (first threshold). If the temporal change rate of evaluation value is smaller than threshold α (NO in the determination at S37), the subsequent processing S37A to S41 is skipped. On the other hand, if the temporal change rate of evaluation value is equal to or greater than threshold α (YES in the determination at S37), measurement trigger generation unit 180 proceeds to step S37A and compares the evaluation value added at step S35 with threshold β (second threshold). If the evaluation value is smaller than threshold β (NO in the determination at S37A), the subsequent processing S38 to S41 is skipped.

On the other hand, if the evaluation value is equal to or greater than threshold β (YES in the determination at S37A), measurement trigger generation unit 180 generates a measurement trigger through the processing at step S38 similar to that in FIG. 19.

Vibration waveform data output unit 170 performs the processing at steps S39 to S41 similar to those in FIG. 19 to output the vibration waveform data of bearing 60 within a certain time immediately before the point of time when the measurement trigger is generated and the vibration waveform data of bearing 60 after the point of time when the measurement trigger is generated, altogether to diagnosis unit 150.

As described above, according to the seventh embodiment, an evaluation value that characterizes vibration waveform data within a certain time is computed, and when the temporal change rate of this evaluation value is equal to or greater than threshold α and the magnitude of evaluation value is equal to or greater than threshold β, it is determined that the tendency of temporal change of evaluation value has changed, and a trigger for starting measurement of vibration waveform data is generated. Even in the case where the temporal change rate of evaluation value is equal to or greater than threshold α, when the magnitude of evaluation value is smaller than threshold β, it can be determined that the degree of effect of noise is large because the degree of vibration which is the magnitude of vibration of bearing 60 is small. In such a case, a trigger is not generated, and this configuration enables generation of a trigger based on the evaluation value from which the effect of noise superimposed on vibration waveform data is eliminated appropriately. The seventh embodiment therefore can also achieve the similar effects as in the fifth embodiment.

Modification to Seventh Embodiment

As described above, when noise is superimposed on the evaluation value, the temporal change rate of evaluation value may be temporarily equal to or greater than threshold α or greater or the evaluation value may be temporarily equal to or greater than threshold β, causing measurement trigger generation unit 180 to erroneously generate a measurement trigger.

Then, measurement trigger generation unit 180 can be configured to generate a measurement trigger when the determination result that the temporal change rate of evaluation value is equal to or greater than threshold α occurs multiple times in succession and when the determination result that the evaluation value is equal to or greater than threshold β occurs multiple times in succession. In this configuration, since the increase of evaluation value is considered as being temporary due to the effect of noise, erroneous generation of a measurement trigger can be prevented.

In the foregoing fifth to seventh embodiments, vibration sensor 70 is installed at bearing 60, which is one of the mechanical components in wind turbine generation apparatus 10, to diagnose abnormality of bearing 60. However, the mechanical component serving as a diagnosis target is not limited to bearing 60. This point is described for clarification. For example, a vibration sensor may be installed at a bearing provided in gearbox 40 or in generator 50 in addition to bearing 60 or in place of bearing 60, and abnormality of the bearing provided in gearbox 40 or in generator 50 may be diagnosed by a similar method as in the foregoing embodiments.

In the foregoing fifth to seventh embodiments, the evaluation value that characterizes vibration waveform data within a certain time is computed by statistically processing the effective values of vibration waveform data within the certain time. However, the evaluation value may be computed by statistically processing the peak value of the vibration waveform data within a certain time. In this configuration, the peak value of vibration waveform data corresponds to the absolute value of maximum or minimum of vibration waveform. Alternatively, the evaluation value may be computed by statistically processing the crest factor of the vibration waveform data within a certain time. In this configuration, the crest factor of vibration waveform data corresponds to the ratio of the effective value to the maximum of vibration waveform.

Eighth Embodiment

In an eighth embodiment, the degree of abnormality of vibration waveform data within a certain time is computed as the evaluation value that characterizes vibration waveform data within a certain time (FIG. 15).

Figure 22:
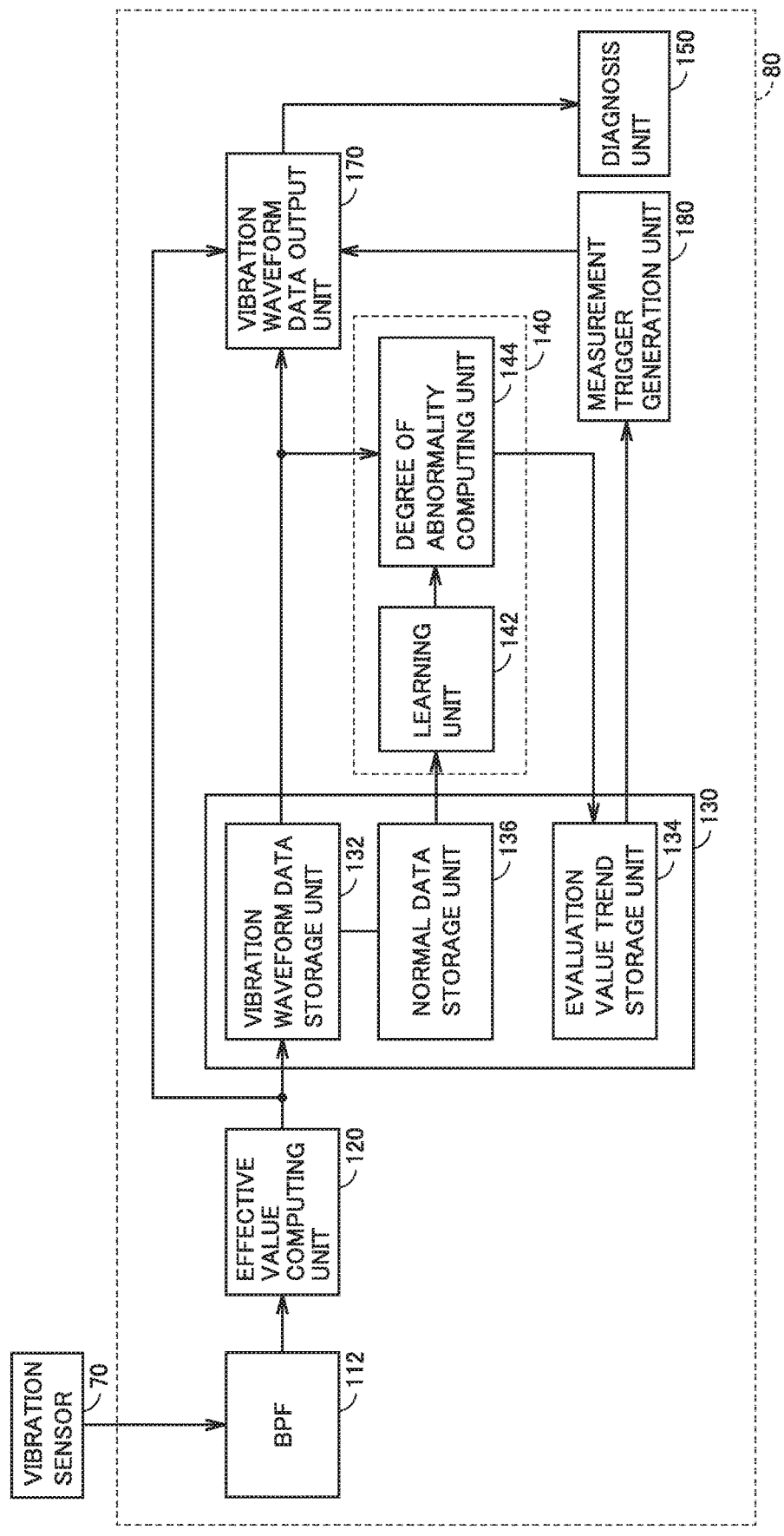
FIG. 22 is a functional block diagram showing the functional configuration of the data processor in the condition monitoring system according to an eighth embodiment.

FIG. 22 is a functional block diagram showing the functional configuration of data processor 80 in the condition monitoring system according to the eighth embodiment of the present invention. Referring to FIG. 22, data processor 80 includes a BPF 112, an effective value computing unit 120, a storage unit 130, a vibration waveform data output unit 170, an evaluation value computing unit 140, a measurement trigger generation unit 180, and a diagnosis unit 150.

Storage unit 130 includes a vibration waveform data storage unit 132, an evaluation value trend storage unit 134, and a normal data storage unit 136. Vibration waveform data storage unit 132, evaluation value trend storage unit 134, and normal data storage unit 136 are configured with, for example, a writable nonvolatile memory.

As explained with reference to FIG. 15, vibration waveform data storage unit 132 is configured to store the effective value of vibration waveform data of bearing 60 (vibration waveform data) within a certain time.

Normal data storage unit 136 is configured to store the effective value of vibration waveform data of bearing 60 (vibration waveform data) measured when the normal operation of wind turbine generation apparatus 10 (see FIG. 1) is ensured (for example, in an initial state). The vibration waveform data stored in normal data storage unit 136 is used for setting a classification boundary in a learning unit 142 described later. In the following description, the vibration waveform data stored in normal data storage unit 136 may be referred to as "learning data".

Evaluation value computing unit 140 reads the vibration waveform data of bearing 60 within a certain time from vibration waveform data storage unit 132 and then computes an evaluation value that characterizes the read vibration waveform data of bearing 60 within a certain time. In the present embodiment, evaluation value computing unit 140 includes a learning unit 142 and a degree of abnormality computing unit 144.

Learning unit 142 reads learning data from normal data storage unit 136 and sets a classification boundary that separates normal from abnormal, based on the read learning data.

Degree of abnormality computing unit 144 applies the classification boundary to the vibration waveform data of bearing 60 within a certain time read from vibration waveform data storage unit 132 to compute the degree of abnormality of the vibration waveform data. The degree of abnormality corresponds to the distance from the classification boundary. The computed degree of abnormality serves as the evaluation value that characterizes the vibration waveform data of bearing 60 within a certain time. Degree of abnormality computing unit 144 is configured to time-sequentially compute the degree of abnormality.

In the present embodiment, in processing the vibration waveform data of bearing 60 within a certain time, evaluation value computing unit 140 divides the vibration waveform data into a plurality of segments and performs processing for each segment. The segments will be described below.

Figure 23:
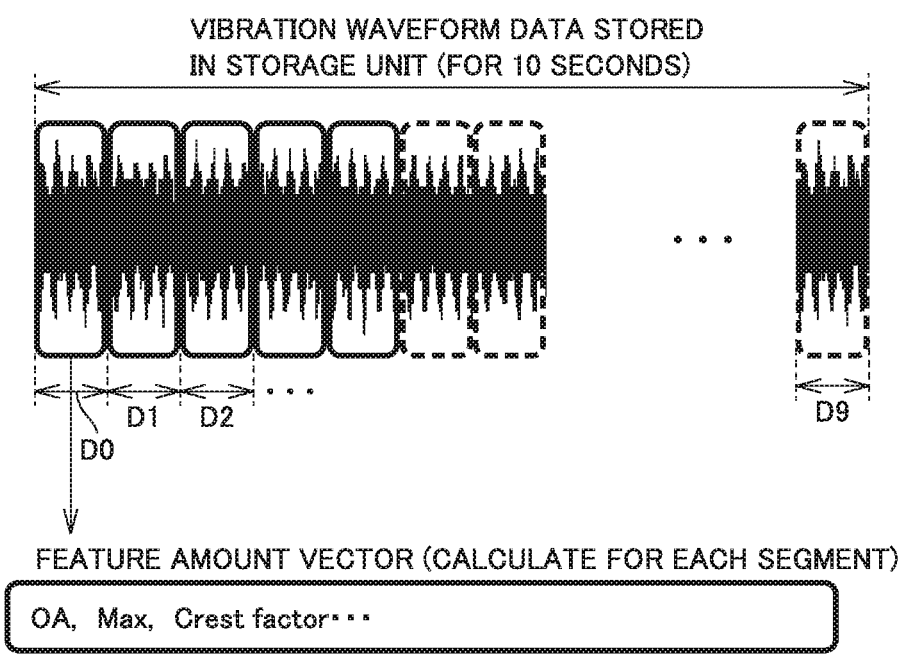
FIG. 23 is a conceptual diagram showing the relation between vibration waveform data of the bearing within a certain time and segments.

FIG. 23 is a conceptual diagram showing the relation between the vibration waveform data of bearing 60 within a certain time and the segments. In the example in FIG. 23, the vibration waveform data within a certain time is vibration waveform data D0 to D9 for 10 seconds, in the same manner as in FIG. 15. Vibration waveform data D0 to D9 for 10 seconds are divided into 10 segments.

Degree of abnormality computing unit 144 generates a feature amount vector for each segment, for vibration waveform data D0 to D9 for 10 seconds. Similarly, learning unit 142 generates a feature amount vector for each segment, for the learning data read from normal data storage unit 136.

Figure 24:
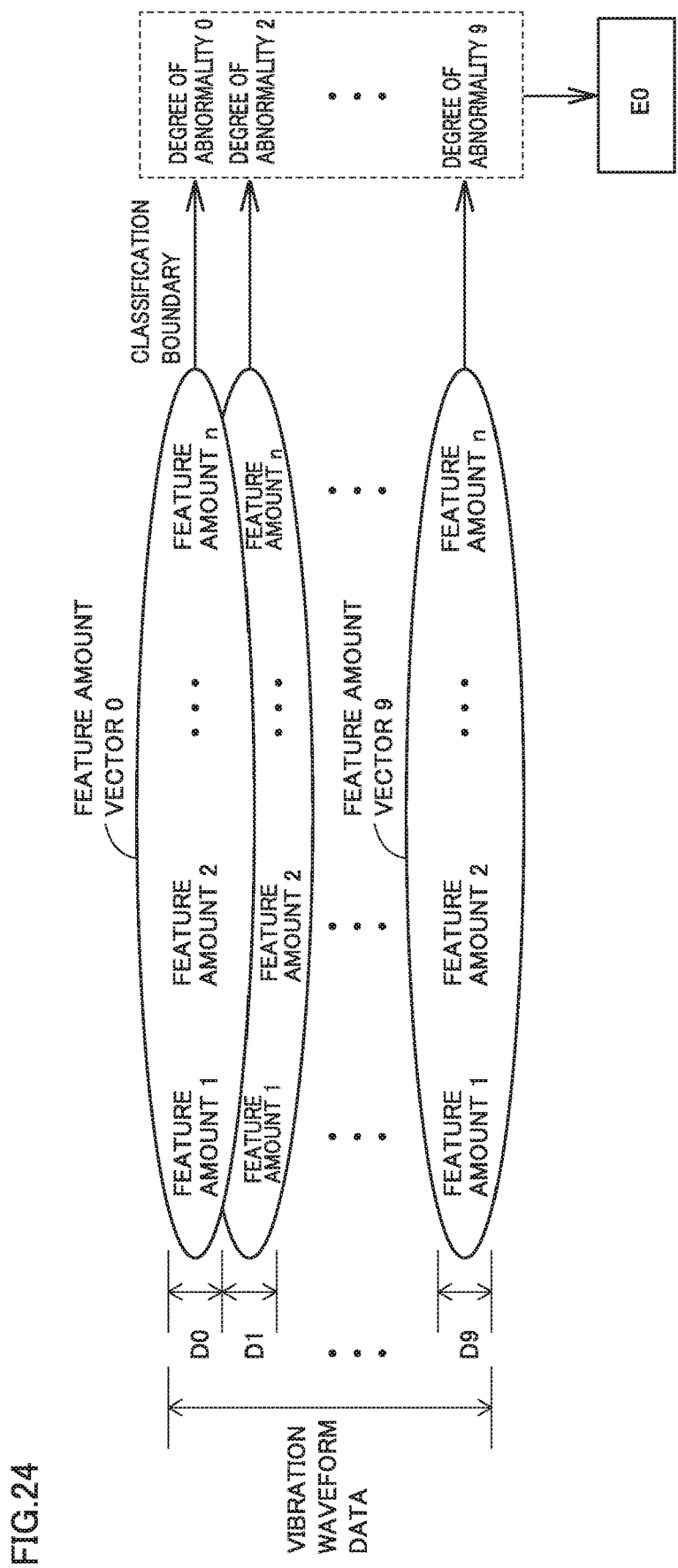
FIG. 24 is a diagram illustrating feature amount vectors.

FIG. 24 is a diagram illustrating the feature amount vectors. In the example shown in FIG. 24, vibration waveform data D0 to D9 for 10 seconds are divided into 10 segments, and there are n feature amounts.

The feature amount may be, for example, an effective value (OA), a maximum value (Max), a crest value (Crest factor), kurtosis, skewness of vibration waveform data, and these values subjected to signal processing (FFT processing, quefrency processing). In the feature amount vector, n feature amounts are treated as a set of vectors. The feature amount vector is used for abnormality determination. In the example in FIG. 24, 10 feature amount vectors are generated for vibration waveform data D0 to D9 for 10 seconds.

If extraction of the feature amount and generation of the feature amount vector are performed for the vibration waveform data within a certain time altogether, the entire data may be unable to be used for diagnosis in a case of sudden abnormality. For this reason, in the present embodiment, the vibration waveform data within a certain time is divided into a plurality of segments, and extraction of the feature amount and generation of the feature amount vector are performed in units of segment. For example, when wind turbine generation apparatus 10 is monitored by vibration sensor 70, abrupt vibration may be temporarily detected by vibration sensor 70. Even in such a case, the correct feature amount can be extracted at the time except for abrupt abnormality. Therefore, the feature amount can be compared and evaluated for each segment, excluding the segment corresponding to abrupt abnormality.

As shown in FIG. 24, the degrees of abnormality 0 to 9 are computed based on the classification boundary, for the feature amount vectors 0 to 9. The classification boundary is an index for determining abnormality for use in the known abnormality detection method (One Class Support Vector Machine: OC-SVM).

Figure 25:
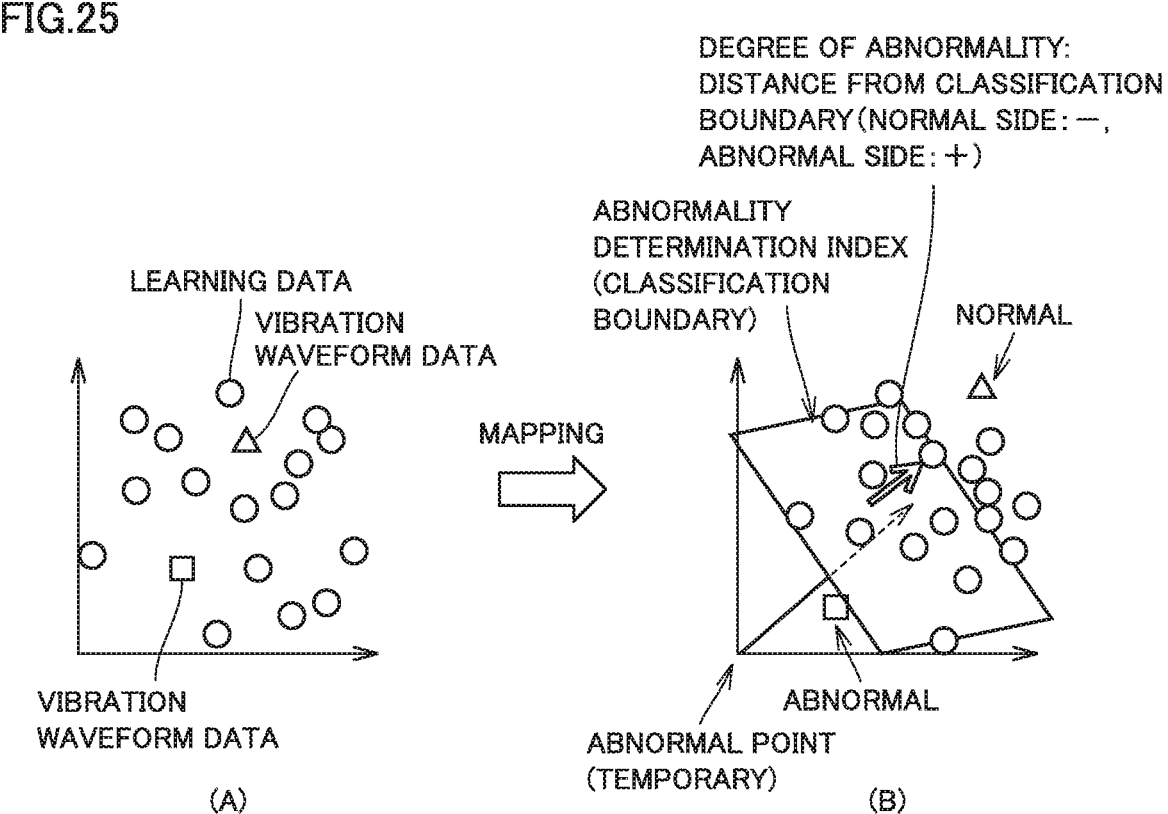
FIG. 25 is a diagram illustrating the basic concept of OC-SVM.

FIG. 25 is a diagram illustrating the basic concept of OC-SVM. The horizontal axis and the vertical axis in FIG. 25 represent the feature amounts different from each other. In FIG. 25, the circle indicates learning data, and the square and the triangle indicate vibration waveform data. In the vibration waveform data, the square is data indicating abnormality, and the triangle is data indicating normality.

For example, as shown in FIG. 25(A), it is assumed that it is impossible to draw a classification boundary that separates normal from abnormal in the learning data and the vibration waveform data, in a two-dimensional scatter diagram with two feature amounts.

On the other hand, the useful feature amount varies depending on the diagnosis target and the operating conditions. Therefore, an appropriate feature amount is selected based on the diagnosis target and the operating conditions. The learning data and the vibration waveform data are mapped in a multi-dimensional feature space including the appropriate feature amounts, thereby generating a classification boundary plane that separates normal from abnormal, as shown in FIG. 25(B).

For the learning data and the vibration waveform data, the degree of abnormality which is the distance from the classification boundary can be calculated. The degree of abnormality is zero on the classification boundary, the degree of abnormality has a negative (−) value on the normal side with respect to the classification boundary, and the degree of abnormality has a positive (+) value on the abnormal side with respect to the classification boundary.

Such a technique is called machine learning by OC-SVM and can convert many feature amounts into one index (degree of abnormality) for evaluation.

Returning to FIG. 22, learning unit 142 sets the classification boundary described above using the learning data. Degree of abnormality computing unit 144 computes the degrees of abnormality 0 to 9 which are the distances from the classification boundary in the feature interval, for each of feature vectors 0 to 9.

Degree of abnormality computing unit 144 statistically processes the calculated degrees of abnormality 0 to 9 to compute evaluation value E0. This computation of evaluation value E0 corresponds to the processing at step S32 in the control process shown in FIG. 19, FIG. 20 and FIG. 21. Evaluation value E0 is a value (representative value) that characterizes the degrees of abnormality 0 to 9 of vibration waveform data for 10 seconds. Therefore, in the statistical processing, with evaluation value E0, the average value of degrees of abnormality 0 to 9 can be computed. Alternatively, for example, the median, mode, or minimum of the degrees of abnormality 0 to 9 can be computed as evaluation value E0.

Alternatively, at step S32 in FIG. 19, FIG. 20, and FIG. 21, the abnormality ratio can be computed as evaluation value E0 by comparing the abnormality determination threshold set based on the learning data with each degree of abnormality. The abnormality ratio can be obtained by dividing the number of degrees of abnormality exceeding a predetermined abnormality determination threshold, of the degrees of abnormality 0 to 9, by the total number of segments (10 segments).

In this way, evaluation value computing unit 140 computes the evaluation value (degree of abnormality) of vibration waveform data of bearing 60 within a certain time, at predetermined time intervals. Evaluation value computing unit 140 outputs the computed evaluation value to evaluation value trend storage unit 134.

As explained with reference to FIG. 16, evaluation value trend storage unit 134 stores the evaluation values (degrees of abnormality) applied from evaluation value computing unit 140 from hour to hour. In the present embodiment, a predetermined number of degrees of abnormality in time sequence corresponds to the "evaluation value trend" representing the tendency of temporal change of the degree of abnormality. Evaluation value trend storage unit 134 updates the evaluation value trend at predetermined time intervals.

Returning to FIG. 22, measurement trigger generation unit 180 reads a predetermined number of degrees of abnormality (evaluation values) in time sequence from evaluation value trend storage unit 134 and then generates a measurement trigger based on the read evaluation value trend. As explained with reference to FIG. 16, when it is determined that the evaluation value trend has changed, measurement trigger generation unit 180 generates a measurement trigger. The generated measurement trigger is applied to vibration waveform data output unit 70.

As explained with reference to FIG. 17, vibration waveform data output unit 170 receives the measurement trigger from measurement trigger generation unit 180 and then reads the vibration waveform data of bearing 60 within a certain time immediately before the point of time when the measurement trigger is generated that is stored in vibration waveform data storage unit 132. Vibration waveform data output unit 170 further receives the vibration waveform data of bearing 60 after the point of time when the measurement trigger is generated from effective value computing unit 120. Vibration waveform data output unit 170 outputs these vibration waveform data altogether to diagnosis unit 150.

Diagnosis unit 150 diagnoses abnormality of bearing 60, based on the vibration waveform data of bearing 60 altogether.

As described above, the condition monitoring system according to the eighth embodiment uses one index (degree of abnormality) generated from a plurality of feature amounts extracted from vibration waveform data, as the evaluation value that characterizes the vibration waveform data within a certain time. Thus, even when a plurality of feature amounts change individually, a change that occurs with a combination different from usual can be grasped. With this configuration, vibration waveform data can be recorded even in a state in which it is unable to be defined what change is to be set as a measurement trigger.

Further, any vibration waveform data that varies during normal operation is recognized as a normal state in the machine learning by OC-SVM, thereby preventing erroneous generation of a measurement trigger. Then, a measurement trigger is generated when the tendency of temporal change of the degree of abnormality differs from normal times, so that an enormous amount of data is accumulated and the vibration waveform data when abnormality occurs can be measured reliably and efficiently. Thus, abnormality can be diagnosed accurately.

In the foregoing fifth to eighth embodiments, a single evaluation value that characterizes the vibration waveform data within a certain time is set, and the measurement of vibration waveform data is started using a change of tendency of temporal change of the single evaluation value, as a trigger. However, the trigger may be that the tendency of temporal change of a plurality of evaluation values has changed.

In the foregoing fifth to eighth embodiments, data processor 80 corresponds to an embodiment of "processor" in the present invention, storage unit 130, evaluation value computing unit 140, and diagnosis unit 150 correspond to an embodiment of "storage unit", "evaluation value computing unit", and "diagnosis unit" in the present invention.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

10 wind turbine generation apparatus, 20 main shaft, 30 blade, 40 gearbox, 50 generator, 60 bearing, 70 vibration sensor, 80 data processor, 90 nacelle, 100 tower, 110 LPF, 112 BPF, 120 effective value computing unit, 130 storage unit, 132 vibration waveform data storage unit, 134 evaluation value trend storage unit, 136 normal data storage unit, 140 evaluation value computing unit, 142 learning unit, 144 degree of abnormality computing unit, 150 diagnosis unit, 160 threshold setting unit, 162 moving average computing unit, 164 standard deviation computing unit, 166 threshold computing unit, 168 threshold storage unit, 170 vibration waveform data output unit, 180 measurement trigger generation unit.

The invention claimed is:

1. A condition monitoring system that monitors a state of a mechanical component in an apparatus, the condition monitoring system comprising:
    a vibration sensor configured to measure a vibration waveform of the mechanical component; and
    a processor configured to diagnose abnormality of the mechanical component,
    the processor including
    an evaluation value computing unit configured to time-sequentially compute an evaluation value that characterizes an effective value of vibration waveform data output from the vibration sensor within a certain time, the evaluation value computing unit computing a minimum value of the effective value of vibration waveform data within the certain time, as the evaluation value;
    a diagnosis unit configured to diagnose abnormality of the mechanical component based on transition of temporal change of the evaluation value; and
    a setting unit configured to set a threshold to a single value that is greater than transition of temporal change of the minimum value of the normal state of the mechanical component while being smaller than transition of temporal change of the minimum value of the abnormal state of the mechanical component, and
    the diagnosis unit being configured to diagnose the mechanical component as being abnormal when the evaluation value exceeds the threshold.

2. The condition monitoring system according to claim 1, wherein
    the diagnosis unit is configured to diagnose the mechanical component as being abnormal when a temporal change rate of the evaluation value exceeds a threshold, and
    the setting unit is configured to set the threshold to a value greater than a temporal change rate of the minimum value in the normal state of the mechanical component, and to a value smaller than a temporal change rate of the minimum value in the abnormal state of the mechanical component.

3. The condition monitoring system according to claim 1, wherein the diagnosis unit is configured to diagnose the mechanical component as being abnormal when the evaluation value exceeds a first threshold and when a temporal change rate of the evaluation value exceeds a second threshold, the setting unit is configured to set the first threshold to a value (1) greater than temporal transition of the minimum value in the normal state of the mechanical component, and (2) smaller than temporal transition of the minimum value in the abnormal state of the mechanical component, and the setting unit is further configured to set the second threshold to a value greater than a temporal change rate of the minimum value in the normal state of the mechanical component, and to a value smaller than a temporal change rate of the minimum value in the abnormal state of the mechanical component.

4. A wind turbine generation apparatus comprising the condition monitoring system according to claim 1.

* * * * *